US012802426B2

(12) United States Patent
Xue et al.

(10) Patent No.: US 12,802,426 B2
(45) Date of Patent: Nov. 17, 2026

(54) TOOTH DETECTION AND LABELING

(71) Applicant: Align Technology, Inc., San Jose, CA (US)

(72) Inventors: Ya Xue, Chapel Hill, NC (US); Yingjie Li, Cary, NC (US); Chao Shi, Morrisville, NC (US); Aleksandr Anikin, Moscow (RU); Mikhail Toporkov, Kolomna (RU); Aleksandr Sergeevich Karsakov, Moscow (RU)

(73) Assignee: Align Technology, Inc., San Jose, CA (US)

( * ) Notice: Subject to any disclaimer, the term of this patent is extended or adjusted under 35 U.S.C. 154(b) by 144 days.

(21) Appl. No.: 18/241,709

(22) Filed: Sep. 1, 2023

(65) Prior Publication Data

US 2023/0410495 A1 Dec. 21, 2023

Related U.S. Application Data

(63) Continuation of application No. 17/246,504, filed on Apr. 30, 2021, now Pat. No. 11,790,643, which is a continuation of application No. 16/182,452, filed on Nov. 6, 2018, now Pat. No. 10,997,727.

(60) Provisional application No. 62/582,785, filed on Nov. 7, 2017.

(51) Int. Cl.

| | |
|---|---|
| ***G06V 10/82*** | (2022.01) |
| ***G06F 18/2413*** | (2023.01) |
| ***G06T 7/00*** | (2017.01) |
| ***G06T 7/13*** | (2017.01) |
| ***G06V 10/44*** | (2022.01) |
| ***G06V 30/19*** | (2022.01) |

(52) U.S. Cl.

CPC ........ *G06V 10/82* (2022.01); *G06F 18/24143* (2023.01); *G06T 7/0012* (2013.01); *G06T 7/13* (2017.01); *G06V 10/44* (2022.01); *G06V 30/19173* (2022.01); *G06T 2207/20081* (2013.01); *G06T 2207/20084* (2013.01); *G06T 2207/20132* (2013.01); *G06T 2207/30004* (2013.01); *G06V 2201/033* (2022.01)

(58) Field of Classification Search

None

See application file for complete search history.

(56) References Cited

U.S. PATENT DOCUMENTS

| | | | | |
|---|---|---|---|---|
| 7,643,659 B2 * | 1/2010 | Cao | G06V 40/171 382/117 |
| 11,735,306 B2 * | 8/2023 | Wirjadi | G06N 3/094 700/98 |
| 2003/0198384 A1 * | 10/2003 | Vrhel | A61B 5/0077 382/128 |
| 2008/0280247 A1 * | 11/2008 | Sachdeva | A61C 7/00 703/11 |
| 2017/0169562 A1 * | 6/2017 | Somasundaram | G06V 10/26 |

(Continued)

*Primary Examiner* — Nancy Bitar

(74) *Attorney, Agent, or Firm* — Lowenstein Sandler LLP

(57) ABSTRACT

A method includes receiving an image of a face, processing the image using a first trained machine learning model to determine a bounding shape around teeth in the image, cropping the image based on the bounding shape to produce a cropped image, processing the cropped image using an edge detection operation to generate edge data for the cropped image, and processing the cropped image and the edge data using a second trained machine learning model to label edges in the cropped image.

22 Claims, 20 Drawing Sheets

(56) References Cited

U.S. PATENT DOCUMENTS

| | | | | |
|---|---|---|---|---|
| 2018/0325484 | A1* | 11/2018 | Patel | A61B 6/51 |
| 2019/0026893 | A1* | 1/2019 | Salah | G06F 18/2414 |
| 2019/0313963 | A1* | 10/2019 | Hillen | A61B 5/4547 |
| 2020/0320685 | A1* | 10/2020 | Anssari Moin | G06V 20/653 |
| 2021/0118132 | A1* | 4/2021 | Kearney | G06N 3/0442 |
| 2021/0358123 | A1* | 11/2021 | Kearney | G06N 3/0985 |

* cited by examiner

1000

Receive Image With Labeled Edges
1005

Subsample Edge Pixels
1010

Generate ROIs
1015

TOOTH DETECTION AND LABELING

RELATED APPLICATION

This patent application is a continuation application of U.S. patent application Ser. No. 17/246,504, filed Apr. 30, 2021, which is a continuation application of U.S. patent application Ser. No. 16/182,452, filed Nov. 6, 2018, which claims the benefit under 35 U.S.C. § 119(e) of U.S. Provisional Application No. 62/582,785, filed Nov. 7, 2017, each of which are incorporated by reference herein.

TECHNICAL FIELD

Embodiments of the present invention relate to the field of dentistry and, in particular, to the use of deep learning with low-cost edge detection for tooth detection and to the use of deep learning with edge labeling for tooth detection and evaluation.

BACKGROUND

In recent years, deep learning, a sub-field of machine learning, has emerged as a powerful tool for image analysis and object detection. Deep learning is best suited for situations where large amount of images (tens of thousands or millions) are available for model building. Classic deep learning methods require not only large numbers of images but also a detailed annotation of every image. Then in the model building process a deep learning algorithm learns a mapping from image region attributes (e.g. color, texture, etc.) to corresponding labels in the annotated images, and stores the mapping in the format of an inference network.

BRIEF DESCRIPTION OF THE DRAWINGS

Embodiments of the present invention are illustrated by way of example, and not by way of limitation, in the figures of the accompanying drawings.

DETAILED DESCRIPTION

Figure 1:
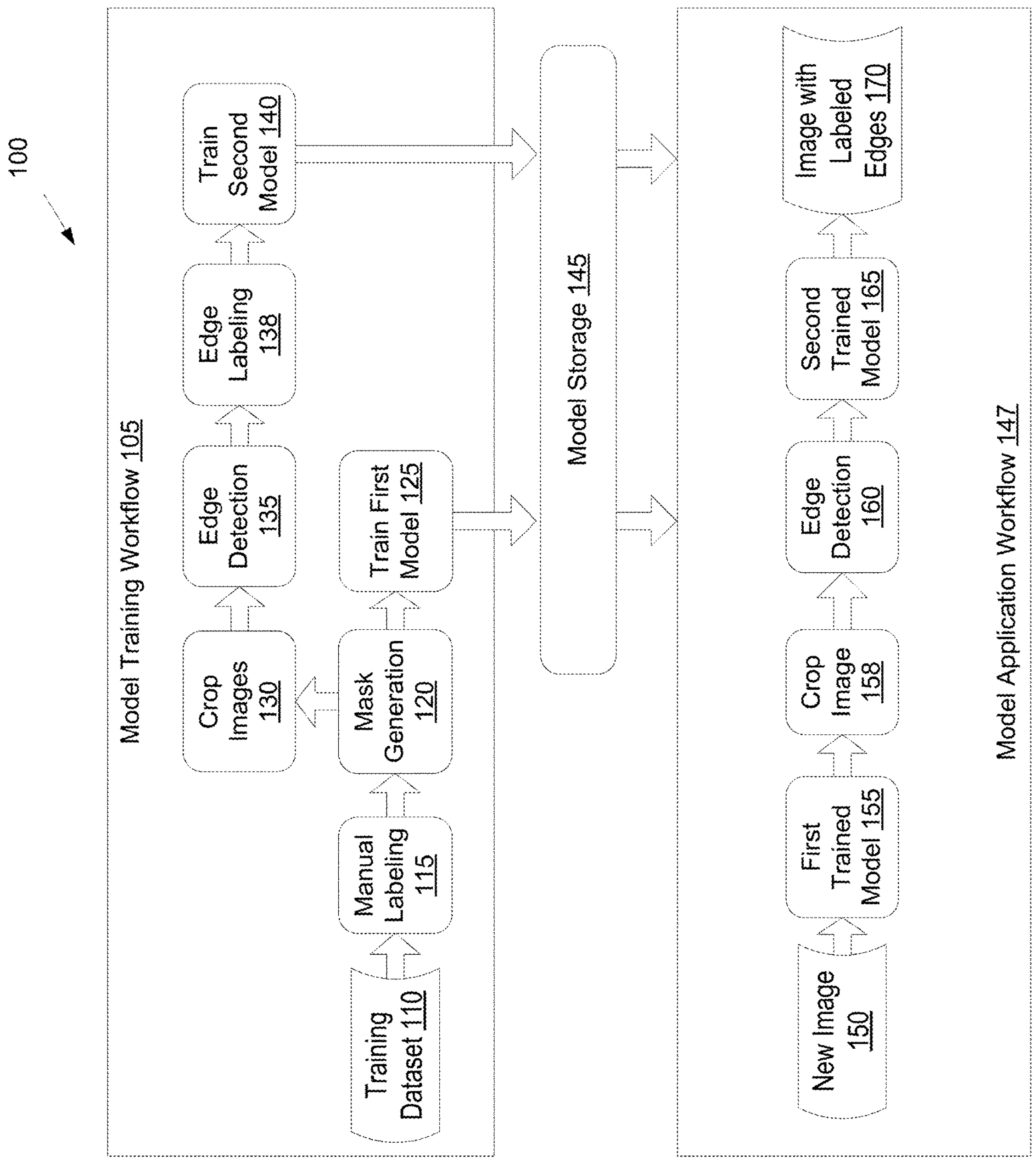
FIG. 1 illustrates workflows for training machine learning models and applying the trained machine learning models to images, in accordance with embodiments of the present invention.

Described herein are methods and systems for analyzing images of teeth and making determinations based on the analysis. Images that contain teeth may be analyzed in an automated fashion without any user input. The automated analysis may include identifying one or more bounding shapes around teeth in an image, identifying a view of teeth in the image, identifying the image as appropriate or inappropriate for further processing, cropping the image based on the one or more bounding shapes, identifying edge classifications for edges in the cropped image (e.g., edges of teeth, gingival edges, aligner edges, and so on), and/or making a determination based on the identified edges. One example determination that may be made is a determination as to whether or not an orthodontic aligner fits a patient. Machine learning models such as deep learning models may be generated for multiple different steps in the automated image analysis of the images containing teeth. For example, a first deep learning model may be trained for determining a bounding shape (or multiple bounding shapes) around teeth in an image of a face or mouth and a second deep learning model may be trained for labeling edges in an image of teeth. The first deep learning model may additionally be trained to classify input images (e.g., as images of typodonts, as images not containing teeth, as images of anterior views of teeth, as images of side views of teeth, as images of occlusal views of mandibular arches, as images of occlusal views of maxillary arches, and so on) in addition to or instead of determining bounding shapes around teeth in images. The first deep learning model may additionally be trained to classify input images as appropriate for further processing or inappropriate for further processing (e.g., if the image does not contain teeth, is of a typodont, is blurry, is dark, does not include images of at least a threshold amount of teeth, etc.).

Multiple deep learning models may be arranged in sequence so that a first deep learning model identifies first information about an image containing teeth (e.g., determines a bounding box around teeth in the image, classifies the image, determines if the image is appropriate for further processing, etc.) and a second deep learning model identifies second information about the image containing teeth using an output of the first deep learning model (e.g., labels or classifies edges in a cropped image that has been cropped based on a bounding shape determined by the first deep learning model). A rules engine or other processing logic may then make determinations about the teeth or perform other operations based on the classified edges in the cropped image. For example, the image that is processed may be an image of a patient's face, where the patient is wearing an orthodontic aligner on their top and/or bottom teeth. In such an example, processing logic may compare edges having a first label (e.g., tooth edges) to adjacent edges having a second label (e.g., aligner edges) to determine a distance between the aligner edges and the tooth edges. If the determined distance is greater than a distance threshold, then the processing logic may determine that the aligner does not properly fit the patient's teeth, and may perform one or more corrective actions, such as sending a notice to a dental practitioner.

In one example embodiment, a method of training a machine learning model includes receiving a training dataset comprising a plurality of images of model persons, each image of the plurality of images comprising a face of a model person and a provided bounding shape around teeth in the image. The model persons may be real persons for whom images have been generated, or may be computer generated persons. The provided bounding shapes may have been generated using a manual process in which a user has drawn the bounding shapes around teeth in the images or an automated or semi-automated process. Such drawn bounding shapes may or may not be labeled. For example, a machine learning model may be trained to determine different bounding boxes around different arrangements of teeth in images of mouths (e.g., a first bounding box around anterior teeth, a second bounding box around left posterior teeth, a third bounding box around right posterior teeth, and a fourth bounding box around all teeth). Each type of bounding box may be accompanied by an appropriate label. Images in the training dataset may further be labeled with an indication of a view represented in the image (e.g., anterior view, side view, occlusal view of mandibular arch, occlusal view of maxillary arch, etc.). Images in the training dataset may further be labeled with an indication of whether the image is appropriate for further processing. Such labels may also indicate why some images are inappropriate for further processing (e.g., no teeth, insufficient number of teeth depicted, too dark, too blurry, etc.).

The method includes inputting the training dataset into an untrained machine learning model and training the untrained machine learning model based on the training dataset to generate a trained machine learning model that defines bounding shapes around teeth in images. For an input image the trained machine learning model may output a mask that defines a single bounding shape around teeth of the input image, wherein the mask indicates, for each pixel of the input image, whether that pixel is inside of a defined bounding shape or is outside of the defined bounding shape. In a further embodiment, for an input image the trained machine learning model may output a mask that defines a union or other combination of multiple different bounding shapes around different teeth in the input image, wherein the mask indicates, for each pixel of the input image, whether that pixel is inside of one of the defined bounding shapes or is outside of the defined bounding shapes. Additionally, for an input image the trained machine learning model may output an indication of a view associated with the image, may output labels associated with one or more bonding shapes (e.g., labeling which teeth are within the bounding box) and/or may output an indication as to whether the image is appropriate for further processing.

In a further example embodiment, a method of determining a bounding shape around teeth in an image includes receiving an image of a face and processing the image using a trained machine learning model. The trained machine learning model may define a bounding shape around teeth in the image based on the processing. Alternatively, or additionally, the trained machine learning model may define bounding shapes around different teeth in the image. Determining a bounding shape may include determining, for each pixel in the image, whether the pixel is inside of a bounding shape or outside of the bounding shape. Determining the bounding shape may further include generating a mask for the image, wherein each entry in the mask is associated with a pixel in the image and indicates for that pixel whether the pixel is inside of the bounding shape (or inside of one of multiple possible bounding shapes) or is outside of the bounding shape (or outside of all of the possible bounding shapes). Accordingly, the deep learning model may receive an image of a face as an input and generate as an output a bounding shape (or multiple bounding shapes) around teeth in the image. Once the mask is generated, the mask (e.g., the determined bounding shape) may be used to crop the image so that pixels that are outside of the bounding shape(s) are cropped. This may reduce a number of pixels to consider for future analysis, and may limit the image to pixels that contain teeth and pixels that are nearby to pixels that contain teeth.

The first step of performing many types of automated analysis of a patient's teeth based on an image is generally to locate the teeth in the image. Many images that contain teeth, and which are to be analyzed, are images of a patient's head, and contain many features that are not teeth. For example, an image to analyze may include hair, eyes, a nose, ears, a background, a chin, a neck, a torso, and so on. These additional features and objects in the image drastically increase a complexity of any image analysis task. However, the region of interest is the region that contains the teeth. Accordingly, the first deep leaning model that generates the bounding shape may make a rough determination of the location of teeth, and may define a bounding shape around an area corresponding to that rough determination. Alternatively, or additionally, the first deep learning model may be trained to generate multiple different bounding shapes around different collections of teeth in input images. For example, the first deep learning model may be trained to generate a first bounding shape around anterior teeth, a second bounding shape around left posterior teeth, a third bounding shape around right posterior teeth, and/or a fourth bounding shape around all teeth. Each of the bounding shapes may be a rectangular or elliptical bounding box, and is not a contour or outline of the teeth. Accordingly, the bounding shape(s) may also contain image information for gums, a tongue, possibly a portion of lips, and so on. However, the bounding shape(s) drastically reduce the area to search to later determine more accurate contours of the teeth using another deep learning model.

A "bounding shape," as used herein, may include a geometrical object that bounds a particular area of an image. It is noted that a bounding shape may comprise any polygon (isolateral or not) or other shape (e.g., elliptical or circular shape). In some implementations, a bounding shape comprises a closed shape having a plurality of sides. Embodiments are described herein with reference to bounding boxes. However, it should be understood that other types of bounding shapes may also be used. Accordingly, discussions of bounding boxes herein also apply to other bounding shapes, such as circles, ellipses, polygons, and so on.

Embodiments cover the use of supervised machine learning to generate a machine learning model (e.g., a deep learning model) that will define a boundary (or multiple boundaries) around teeth in an image. For supervised machine learning, a training dataset that will be used to train the machine learning model needs to be generated with labels in each data point (e.g., each image in the training dataset). The task of defining the contours of teeth in a single image is very time consuming. Accordingly, it is time and cost prohibitive to generate the contours around the thousands of images in a training dataset that would be used for training a deep learning model. Accordingly, embodiments cover the use of rough labeling of teeth in images using bounding boxes (e.g., rectangles and/or ellipses). These bounding boxes serve as a course label for the teeth. The bounding boxes do not identify exactly where the teeth are or what the teeth shapes are, but instead identify a tooth region in an image. The tooth region may be a region containing all teeth in the image, or a region containing a subset of teeth in the image (e.g., anterior teeth, left posterior teeth, right posterior teeth, etc.). The task of manually defining a bounding box around teeth in an image is drastically quicker than the task of contouring the teeth in an image. The training dataset with the rough tooth labeling can be used to train a deep learning model that will define one or more rough tooth label (bounding box) around a teeth region in an image. This rough labeling still provides good detection of teeth, but at a fraction of the complexity and time.

In some embodiments, an initial machine learning model is initially trained using a small dataset with manually labeled bounding boxes. This machine learning model may then be used to automatically define bounding boxes around additional images in a training dataset that will be used to train a more accurate machine learning model (or to further train the initial machine learning model. The bounding boxes generated for images in the training dataset may be reviewed by a user, and may be corrected by the user where they are incorrect. The extended dataset may then be used to train a final model to define bounding boxes around images. This iterative process of generating the machine learning model that defines bounding boxes makes it possible to prepare a large training dataset with minimal user time spent annotating images.

The finer contouring of the teeth can then be performed using a subsequent deep learning model. The region inside of the bounding box will contain teeth, gingiva, tongue, etc., but will omit image data about a background, eyes, nose, hair, and so on. This drastically reduces the complexity of future image processing tasks on the image. The image may be cropped using the bounding box (rough tooth region label), and many different types of further image processing operations may be performed on the image, such as edge detection, segmentation (e.g., tooth segmentation, and so on). Additionally, the cropped image may be applied to further deep learning models to determine additional information about the teeth. Accordingly, the labeling of teeth in an image may be broken up into multiple steps, where different deep learning models are used at the different steps.

In one embodiment, a method of training a machine learning model includes receiving a training dataset comprising a plurality of images, each image of the plurality of images comprising teeth, one or more labeled edges associated with the teeth, and unlabeled edges, wherein at least one labeled edge is a tooth edge. The images may have each been first labeled with a bounding box, and may have been trimmed according to the bounding box (e.g., using the deep learning model that defines a bounding box around teeth in an image). The cropped images may then be processed using edge detection operations to define edges in the image. These edges may then be labeled by a user as one of, for example, a tooth edge, an aligner edge, a gingival edge, an overlapping tooth and aligner edge, and so on. The training dataset may be input into an untrained machine learning model, and the untrained machine learning model may be trained based on the training dataset to generate a trained machine learning model that labels edges in images comprising teeth. For an input image comprising teeth and a plurality of edges the trained machine learning model is to generate a matrix that identifies, for each edge pixel from the input image, an assigned label indicating an edge classification for the edge pixel, wherein the edge classification for a subset of the edge pixels is a tooth edge classification.

In one embodiment, a method includes receiving an image of teeth. The image may have been processed, for example, by a deep learning model that defines a bounding box around teeth in an image (or multiple bounding boxes around different subsets of teeth in the image), and the image may have been cropped based on the bounding box or multiple bounding boxes. The method further includes processing the image using an edge detection operation to generate edge data for the image. The method further includes processing the image comprising the edge data using a trained machine learning model to determine edge classifications for edges in the edge data, wherein one of the edge classifications is a tooth edge classification. Other edge classifications may include an aligner edge classification, a gingival edge classification, an overlapping tooth and aligner edge classification, and a miscellaneous edge classification, for example. The method may further include generating, based on the processing, a matrix that identifies, for each edge pixel of the edge data, an edge classification for the edge pixel.

In one embodiment, a method includes receiving an image of a face and processing the image using a first trained machine learning model to determine a bounding box around teeth in the image (or multiple bounding boxes around different subsets of teeth in the image). The method further includes cropping the image based on the bounding box (or multiple bounding boxes) to produce a cropped image. The method further includes processing the cropped image using an edge detection operation to generate edge data for the cropped image. The method further includes processing the cropped image comprising the edge data using a second trained machine learning model to label edges in the cropped image. Once the edges are labeled, the edge data may be processed to make determinations about the teeth in the image. For example, if the edge labels include a tooth edge and an aligner edge, then a distance between tooth edges and nearby aligner edges may be computed and compared to a threshold. If the distance is less than a threshold, then a determination may be made that an orthodontic aligner fits a user's teeth. If the distance is greater than or equal to the threshold, then a determination may be made that the orthodontic aligner does not fit the patient's teeth and/or that the orthodontic aligner has not repositioned the patient's teeth in accordance with a treatment plan.

Referring now to the figures, FIG. 1 illustrates workflows for training machine learning models and applying the trained machine learning models to images, in accordance with embodiments of the present invention. The illustrated workflows include a model training workflow 105 and a model application workflow 147. The model training workflow 105 is to train one or more machine learning models (e.g., deep learning models) to perform one or more image processing and labeling tasks for an image containing teeth. The model application workflow 147 is to apply the one or more trained machine learning models to label one or more properties and/or areas in images of teeth.

One type of machine learning model that may be used is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize that the image contains a face or define a bounding box around teeth in the image. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available.

The model training workflow 105 and the model application workflow 147 may be performed by processing logic executed by a processor of a computing device. These workflows 105, 147 may be implemented, for example, by one or more machine learning modules 1650 executing on a processing device 1602 of computing device 1600 shown in FIG. 16. Additionally FIGS. 2-15 below describe example operations and/or methods associated with training a machine learning model or applying a trained machine learning model to an input image. The operations and/or methods described with reference to FIGS. 2-15 may be performed by processing logic that may comprise hardware (e.g., circuitry, dedicated logic, programmable logic, microcode, etc.), software (e.g., instructions run on a processing device to perform hardware simulation), or a combination thereof. These methods and/or operations may be implemented, for example, by one or more machine learning modules 1650 executing on a processing device 1602 of computing device 1600 shown in FIG. 16.

For the model training workflow 105, a training dataset 110 containing hundreds, thousands, tens of thousands, hundreds of thousands or more images that include teeth are labeled using a manual labeling 115 task. The images may include front view images of faces, side view images of faces, front view and side view images of faces, occlusal views of mouths and/or other images. The images are two-dimensional (2D) images in one embodiment.

Figure 3:
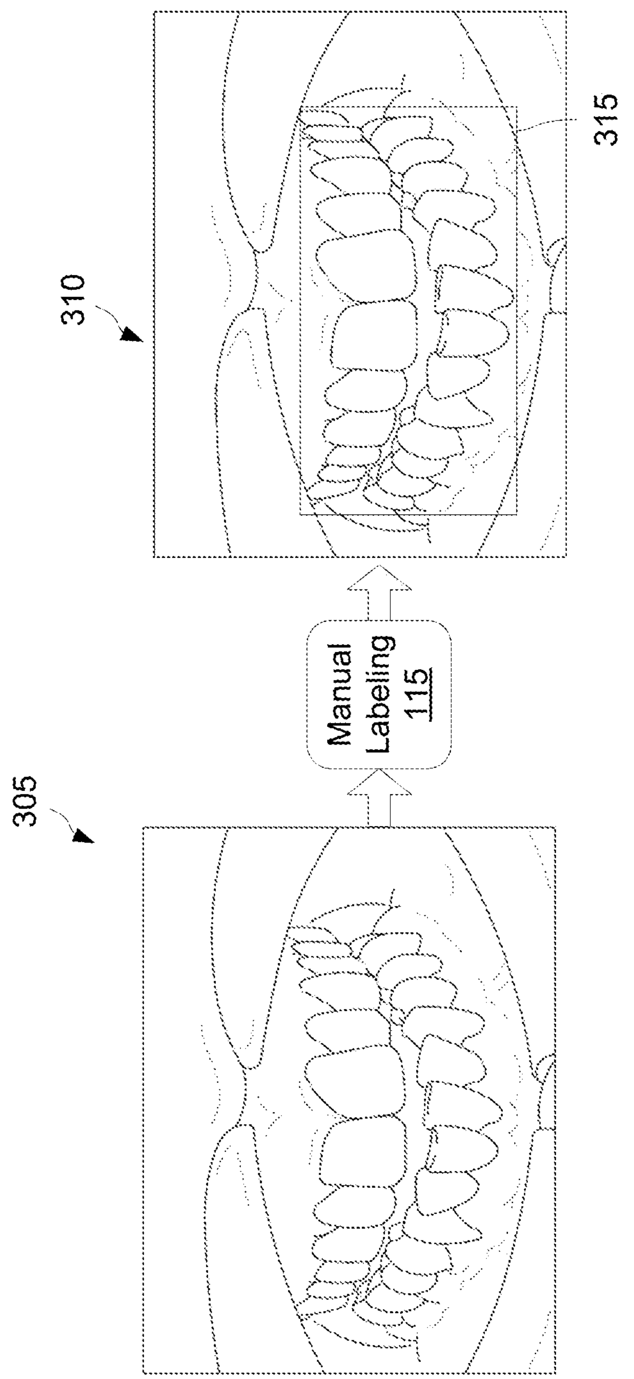
FIG. 3 illustrates rough labeling of teeth in an image, in accordance with an embodiment.

The manual labeling 115 may be completely manual or may be partially automated. For manual labeling 115, a user may draw a bounding box around the teeth in each image in the training dataset 110. In some instances, a user may dray multiple bounding boxes, where each bounding box is drawn around a different subset of teeth in the image. A user may then label each of the multiple bounding boxes (e.g., as anterior teeth, left posterior teeth, right posterior teeth, all teeth, etc.). Accordingly, labeling the images in the training dataset includes defining bounding boxes around a teeth region in each image. The bounding boxes are rough labels that identify a teeth region, but that do not identify shapes of teeth. The bounding boxes may include image data for teeth, gingiva, tongue, and so on. The rough labeling of the tooth region is drastically quicker than performing fine labeling of teeth in the images (e.g., by contouring the teeth in the images). FIG. 3 illustrates rough labeling of teeth in an image, in accordance with an embodiment. As shown, a data point (image) 305 from the training dataset is provided. Manual labeling 115 is then performed on the image 305. An output of the manual labeling is labeled image 310 that includes bounding box 315 around the teeth region in the image. The image originally contained a large amount of black space, an apparatus that spread a patient's lips wide open to reveal the teeth, gums, and a shadow of a nose as well as gingiva and teeth. The bounding box 315 excludes much of the black space, the apparatus, the lips, and the shadow of the nose.

In addition to, or instead of, labeling images with bounding boxes, users may label images with an indication of a view associated with the image (e.g., identifying an image as an anterior view, a left side view, a right side view, an occlusal view of the mandibular arch, an occlusal view of the maxillary arch, a view of a typodont, etc.). Moreover, a user may label images with indications of whether those images are appropriate for further processing. For images that are not appropriate for further processing, the user may add a label indicating why the image is inappropriate for further processing (e.g., no teeth, insufficient number of teeth, too blurry, too dark, etc.).

In some embodiments, one or more of the above described manual labeling tasks may be automated or semi-automated using one or more image processing techniques. For example, in some embodiments an initial machine learning model is initially trained using a small dataset with manually labeled bounding boxes. This machine learning model may then be used to automatically define bounding boxes around additional images in a training dataset that will be used to train a more accurate machine learning model (or to further train the initial machine learning model. The bounding boxes generated for images in the training dataset may be reviewed by a user, and may be corrected by the user where they are incorrect. The extended dataset may then be used to train a final model to define bounding boxes around images.

Returning to FIG. 1, after manual labeling 115 is complete for an image, a mask generation 120 operation may be performed for that image. Mask generation includes generating a binary mask based on the image and a bounding box in the image. The binary mask may be a binary matrix that includes a number of entries that is equal to a number of pixels in the image for which the mask is generated. The binary mask may have a number of columns that is equal to a horizontal number of pixels in the input image and may have a number of rows that is equal to a vertical number of pixels in the input image. Accordingly, each entry in the mask may correspond to a specific pixel in the image. In one embodiment, a separate binary mask is generated for each bounding box associated with an image. In one embodiment, one or more binary masks are based on a combination or union of one or more bounding boxes associated with an image.

Figure 4:
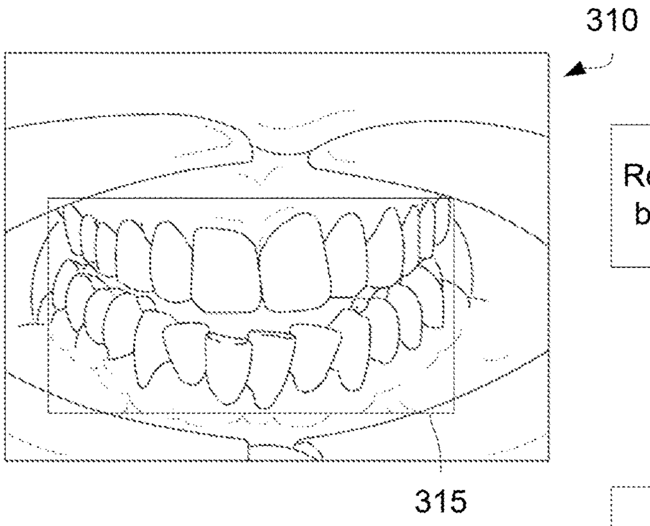
FIG. 4 illustrates a flow diagram for a method of generating a binary mask based on an image with a bounding box, in accordance with an embodiment.
Figure 4:
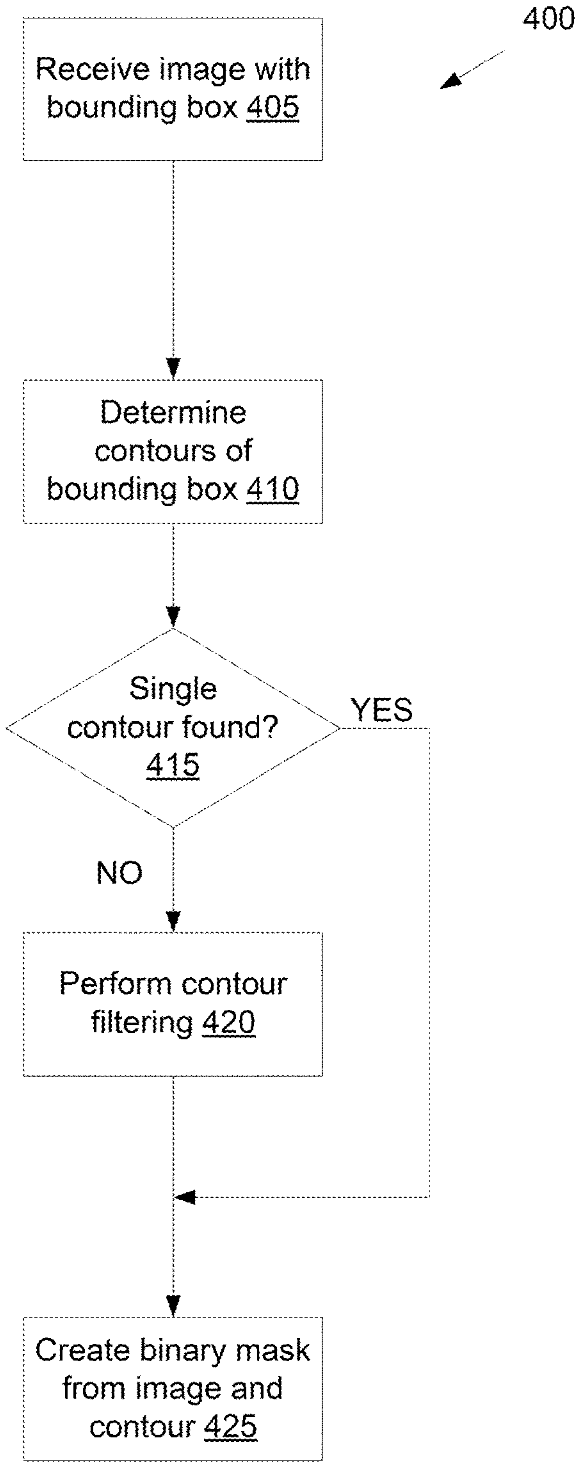
Figure 4:
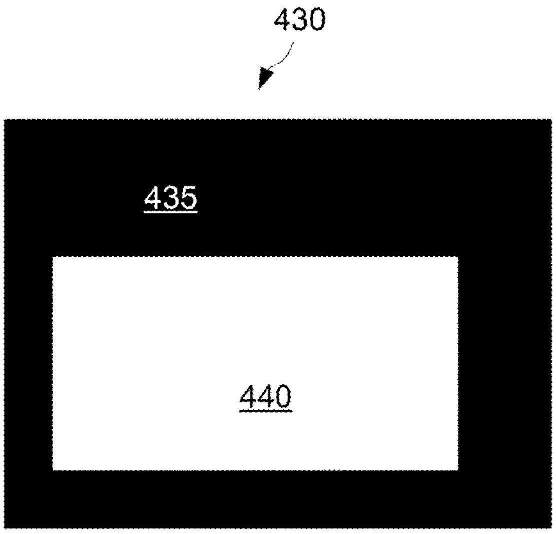

FIG. 4 illustrates a flow diagram for a method 400 of generating a binary mask based on an image with a bounding box, in accordance with an embodiment. At block 405 of method 400, processing logic receives an image with a bounding box. The image may be example image 310 that includes bounding box 315, for example. At block 410, processing logic determines contours of the bounding box. The contours of the bounding box may be determined using an image processing operation or algorithm that searches for color variations and a particular type of shape (e.g., rectangles or ellipses). Many known image processing algorithms may be used to determine the contours, such as color matching.

At block 415, processing logic determines whether a single contour has been found for the bounding box. If a single contour has been found, then the method proceeds to block 425. However, if multiple contours have been found for the bounding box, then the method proceeds to block 420. At block 420, a contour filtering image processing operation is performed (e.g., using a contour filtering algorithm). A result of the contour filtering may be a single contour for the bounding box. Multiple contours may be found due to noise and variations in the image. Only one of those contours is the bounding box. The remove falsely detected contours (those contours that do not represent the bounding box), filters that do not meet certain criteria are filtered out. The filtering criteria may be a shape criterion (e.g., a rectangular shape or an oval shape), a size criterion, a color criterion, some other criteria, or a combination thereof.

At block 425, processing logic creates a binary mask from the image and the determined contour. As indicated above, the binary mask may have a number of columns that is equal to the number of horizontal pixels in the image and may have a number of rows that is equal to the number of vertical pixels in the image. The binary mask may itself be a binary image with a size that matches a size of the image. The binary mask may include a first value for entries associated with pixels in the image that are inside of the bounding box contour and may include a second value for entries associated with pixels in the image that are outside of the bounding box contour.

An example binary mask 430 is shown. The binary mask 430 is shown as a binary image having a same pixel size as the image 310. The binary mask 430 includes a first region 435 of entries or pixels having a first value (e.g., a 0 value) and a second region 440 of entries or pixels having a second value (e.g., a 1 value).

In some embodiments, an image may be labeled with multiple different bounding boxes. For example, an occlusal view of an upper or lower dental arch may include a first bounding box around anterior teeth, a second bounding box around left posterior teeth, a third bounding box around right posterior teeth and/or a fourth bounding box around all teeth. The operations of method 400 may be performed separately for each bounding box in some embodiments. This may result in a set of multiple (e.g., four) different masks, where each mask identifies the pixels that are inside of and outside of a particular one of the multiple bounding boxes. In some instances, a union of two or more of the bounding boxes may be performed to generate a combined mask. For example, the second region 440 of each of a first mask associated with anterior teeth, a second mask associated with left posterior teeth and a third mask associated with right posterior teeth may be combined to form a combined mask.

Returning again to FIG. 1, multiple different operations may be performed once the masks are generated for the images in the training dataset 110 from the bounding boxes. A first operation that may be performed is to train a first machine learning model 125 using the training dataset 110, where the images in the training dataset 110 at this point each have a bounding box (or multiple bounding boxes) and are each associated with a binary mask that is based on the bounding box (or multiple bounding boxes). The first machine learning model (e.g., first deep learning model) may be trained to determine bounding boxes around teeth in images of faces. The first machine learning model 125 may further be trained to classify images (e.g., as an anterior view of teeth, as a left side view of teeth, as a right side view of teeth, as an occlusal view of a mandibular arch, as an occlusal view of a maxillary arch, and so on). The first machine learning model 125 may further be trained to classify images as appropriate for further processing or as inappropriate for further processing.

Figure 5:
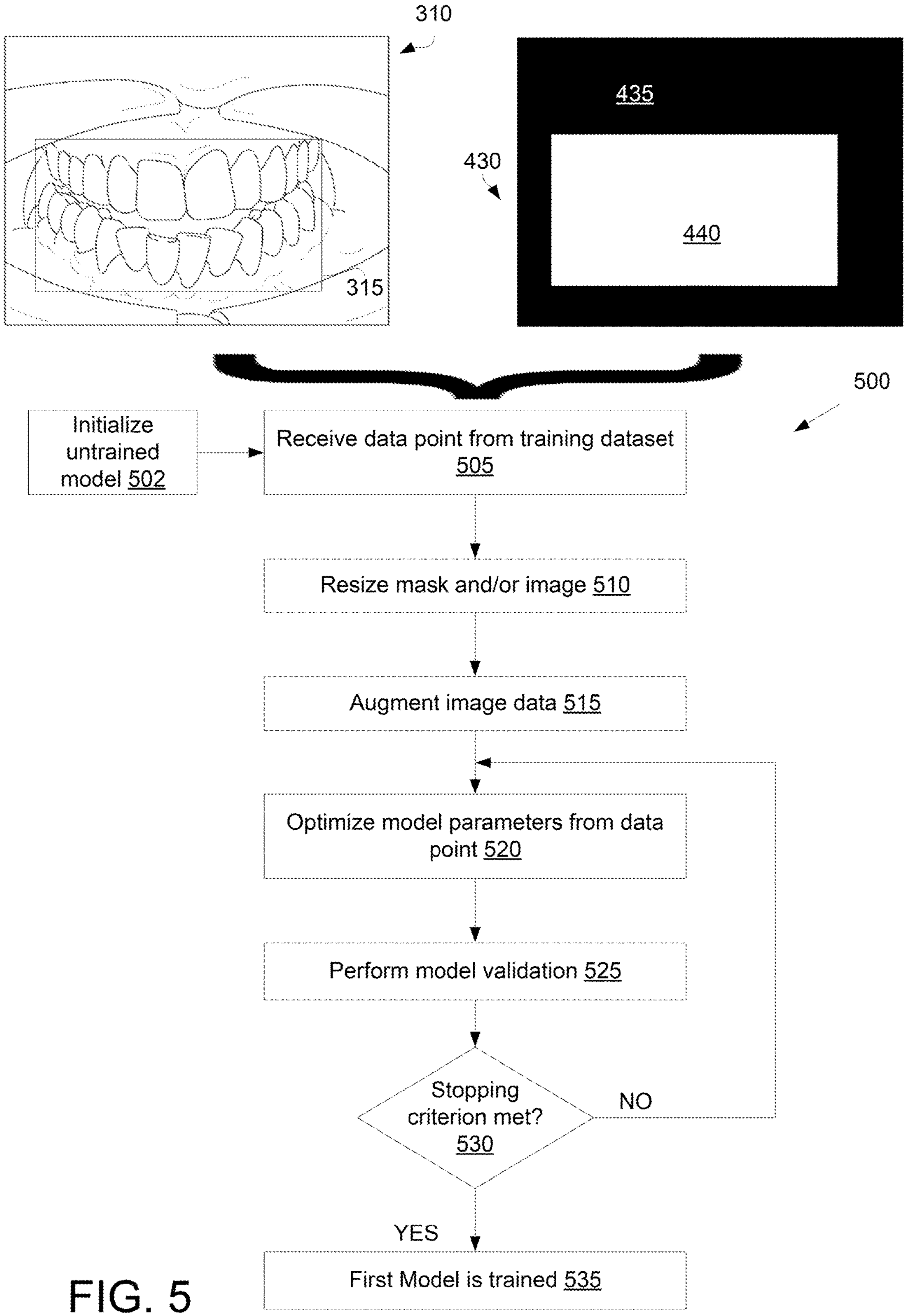
FIG. 5 illustrates a flow diagram for a method of training a machine learning model to determine bounding boxes around teeth in images, in accordance with an embodiment.

FIG. 5 illustrates a flow diagram for a method 500 of training a machine learning model to determine bounding boxes around teeth in images, in accordance with an embodiment. At block 502 of method 500, an untrained machine learning model is initialized. The machine learning model that is initialized may be a deep learning model such as an artificial neural network. One type of artificial neural network that may be initialized and then trained is a u-net. In one embodiment, the u-net is initialized with an inception module. Initialization of the artificial neural network may include selecting starting parameters for the neural network. The solution to a non-convex optimization algorithm depends at least in part on the initial parameters, and so the initialization parameters should be chosen appropriately. In one embodiment, parameters are initialized using Gaussian or uniform distributions with arbitrary set variances. In one embodiment, the artificial neural network is initialized using a Xavier initialization.

In one embodiment, the machine learning model that is initialized and then trained is a region-convolution neural network (R-CNN). An R-CNN is a type of CNN that is able to locate and detect objects in images. The output of an R-CNN may be a set of bounding boxes that closely match each of the detected objects, as well as a class output for each detected object (e.g., anterior teeth, left posterior teeth, right posterior teeth, all teeth, etc.). In one embodiment, the machine learning model is a single shot multi-box detector (SSD). Since an SSD is single shot, it performs the tasks of object localization and classification in a single forward pass of the network within the machine learning model. Since an SSD is also a detector, it classifies detected objects (e.g., labels bounding boxes as to which type of teeth it contains). An SSD may use an inception module in one embodiment.

At block 505, the untrained machine learning model receives a first data point from a training dataset. The first data point may be, for example, image 310 along with mask 430. At block 510, the mask and/or the image may be resized. For example, the machine learning model may be usable for images having certain pixel size ranges, and the image may be resized if it falls outside of those pixel size ranges. Training images may come in different sizes. However, many deep learning algorithms only accept image having a fixed size. Therefore, images in the training dataset (and their accompanying masks) may be resized so that they have the fixed size. The images may be resized, for example, using methods such as nearest-neighbor interpolation or box sampling. At block 515, the image data may then be augmented. Training of large-scale neural networks generally uses tens of thousands of images, which are not easy to acquire in many real-world applications. Data augmentation can be used to artificially increase the effective sample size. Common techniques include random rotation, shifts, shear, flips and so on to existing images to increase the sample size.

At block 520, processing logic optimizes parameters of the machine learning model from the data point. The machine learning model applies a classification or label to the image based on its current parameter values. An artificial neural network includes an input layer that consists of values in a data point (e.g., RGB values of pixels in the image 310). The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class. For the artificial neural network being trained, there may be a first class (inside of bounding box) and a second class (outside of bounding box). Moreover, that class is determined for each pixel in the image. For each pixel in the image, the final layer applies a probability that the pixel of the image belongs to the first class (inside of bounding box) and a probability that the pixel of the image belongs to the second class (outside of the bounding box).

In embodiments where the machine learning model is trained to define multiple different types of bounding boxes (e.g., bounding boxes for anterior teeth, left posterior teeth, right posterior teeth, all teeth etc.), multiple different classes may be determined for each pixel in the image. These classes may include inside of anterior bounding box, outside of anterior bounding box, inside of left posterior bounding box, outside of left posterior bounding box, inside of right posterior bounding box, outside of right posterior bounding box, inside of dental arch (all teeth) bounding box, outside of dental arch bounding box. For example, a particular pixel may be marked as inside of a first bounding box and outside of a second bounding box.

Processing logic compares the classification or label (or multiple classifications or labels) to the provided classification(s) or label(s) (in this case mask 430) to determine one or more classification error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

The above process may further be applied to train the machine learning model to classify the views represented in images and/or to classify images as appropriate for further processing and/or inappropriate for further processing.

Once the model parameters have been optimized, model validation may be performed at block 525 to determine whether the model has improved and to determine a current accuracy of the deep learning model. At block 530, processing logic determines whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. If the stopping criteria is not met, the method may return to block 520 to further optimize the model based on another data point from the training dataset. Alternatively, the method may return to block 505 in an embodiment. If the stopping criteria has been met, the method continues to block 535 and a first machine learning model is trained. As noted herein, the first machine learning model may be an artificial neural network (or other deep learning model) such as a u-net or SSD. However, other types of machine learning models may also be used.

The machine learning model that is trained may output, for an input image, a mask that has a same resolution as the input image (e.g., the same number of horizontal and vertical pixels). The mask is a binary mask that includes a first value for a pixel if the pixel is inside of a determined bounding box and a second value for the pixel if the pixel is outside of the determined bounding box. The bounding box is defined during the processing of the image, and the defining of the bounding box and the generation of the mask may be performed together on a pixel by pixel basis. Accordingly, the trained machine learning model makes a pixel level decision for each pixel in an input image as to whether that pixel is inside of or outside of a bounding box around teeth in the image. The output mask may be based on a single bounding box or may be based on a combination of multiple bounding boxes. Alternatively, or additionally, the machine learning model may be trained to output multiple different masks, such as a first mask for anterior teeth, a second mask for left posterior teeth, a third mask for right posterior teeth and/or a fourth mask for all teeth.

Returning again to FIG. 1, once the first machine learning model (deep learning model) is trained, that trained machine learning model is stored in model storage 145. Model storage 145 may include storage of one or more machine learning models in a permanent storage, such as a storage server, which may include solid state storage devices, hard disk drives, tape back drives, and so on.

Figure 2:
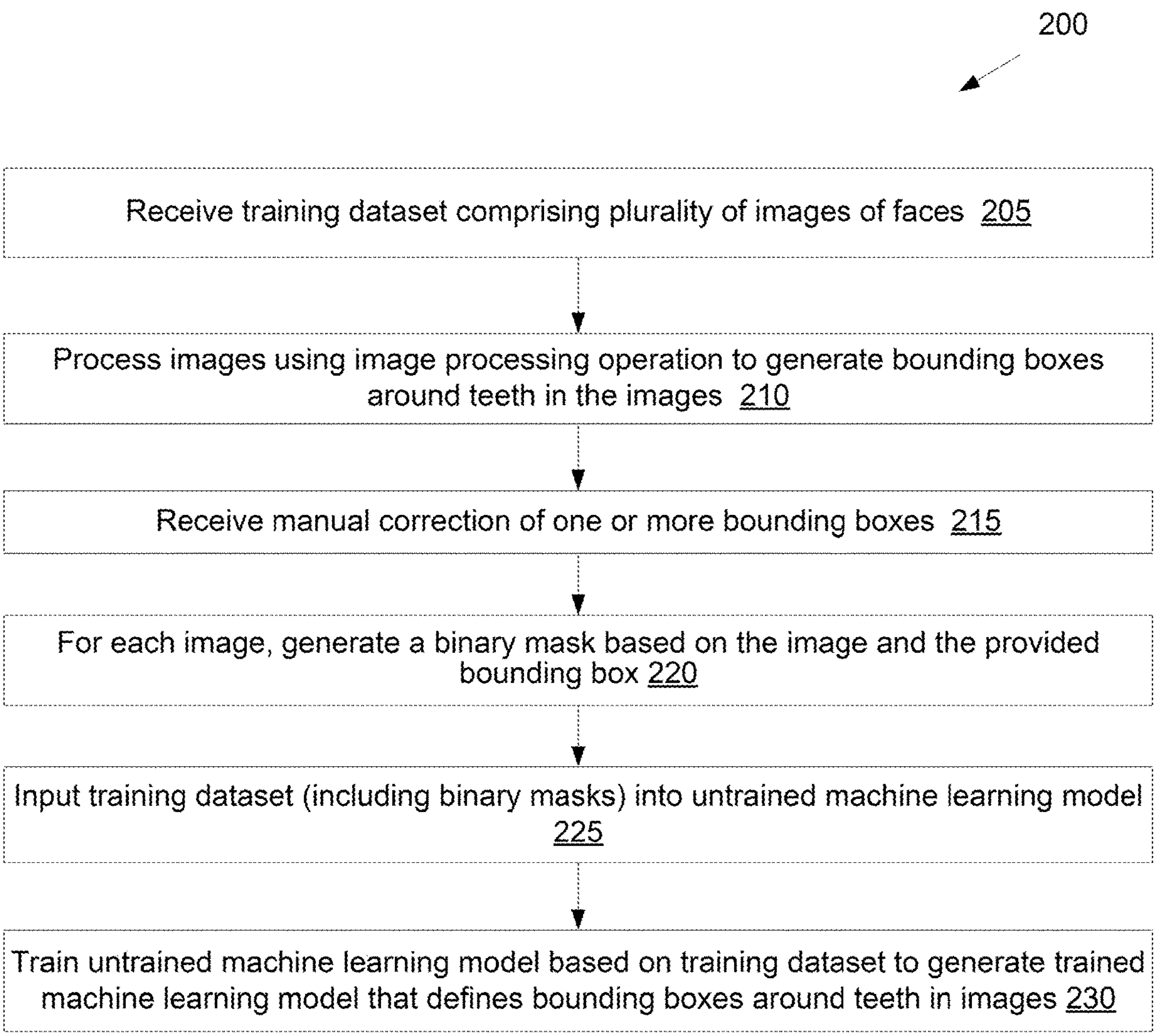
FIG. 2 illustrates a flow diagram for a method of training a machine learning model to determine bounding boxes around teeth in images, in accordance with an embodiment.

FIG. 2 illustrates a flow diagram for a method 200 of training a machine learning model to determine bounding boxes around teeth in images, in accordance with an embodiment. Method 200 may include operations of manual labeling 115, mask generation 120 and training of the first machine learning model 125 set forth in FIG. 1 in some embodiments. At block 205 of method 200, processing logic receives a training dataset comprising a plurality of images of faces. At block 210, the images are processed using an image processing operation to generate bounding boxes around teeth in the images. Images may be augmented with a single bounding box or with multiple different bounding boxes. In the case that multiple bounding boxes are added, these different bounding boxes may each be given an appropriate label, such as anterior teeth bounding box, left posterior teeth bounding box, and so on. At block 215, the images with the bounding boxes are reviewed by a user, who may perform manual correction of one or more of the bounding boxes.

At block 220, for each image, processing logic generates a binary mask or matrix based on the image and the provided bounding box. Alternatively, or additionally, processing logic may generate multiple binary masks, where each binary mask is based on a particular provided bounding box. The binary mask includes a first value for entries corresponding to pixels in the image that are inside of a bounding box and includes a second value for entries corresponding to pixels in the image that are outside of a bounding box. At block 225, the images from the training dataset (including the generated binary masks) are input into the untrained machine learning model. The images may be input into the machine learning model one at a time, and the machine learning model may be updated after processing each image. At block 230, the untrained machine learning model is trained based on the training dataset to generate a trained machine learning model that defines bounding boxes around teeth in images. The operations of block 225 and block 230 may be performed together as a single operation in embodiments.

Returning again to FIG. 1, after mask generation 120, the training dataset 110 may be further modified for training of a second machine learning model (e.g., a second deep learning model). This may result in two different training datasets that are based on the same original images, which have been modified in different ways for each of the training datasets. At block 130, the images from the training dataset 110 are cropped based on the associated masks generated at mask generation 120. Alternatively, the images may be cropped based on the images with the bounding boxes added thereto after manual labeling 115.

After the images are cropped, edge detection 135 may be performed on the cropped images. The edge detection may include application of an automated image processing function, such as an edge detection algorithm. After the images are cropped, the images are primarily or exclusively of teeth regions, and include far fewer features than the uncropped versions of the images. This may improve an accuracy and quality of the edge detection operations, and may further reduce an amount of processing required to complete the edge detection, reduce a time that it takes to complete the edge detection, and increase the relevancy of detected edges for later processing (e.g., to train a machine learning model to classify edges relevant to dentistry and/or to make determinations about a patient's teeth from the edges). On example edge detection operation or algorithm that may be used is multiscale combinatorial grouping. Other examples of edge detection algorithms that may be used are the Canny edge detector, the Deriche edge detector, first order and second order differential edges detectors (e.g., a second order Gaussian derivative kernel), a Sobel operator, a Prewitt operator, a Roberts cross operator, and so on. A segmentation operation (e.g., a tooth segmentation operation) may also be performed on the cropped images instead of or in addition to the edge detection. A tooth segmentation operation may be applied to the image with or without the edge data added thereto to contour each of the teeth in the image, segment the teeth contours into separate teeth, and so on. In one embodiment, a combination of multiple edge detection algorithms and/or segmentation algorithms are used for edge detection 135.

Edge labeling 138 is performed on the images after the edge detection 135 is complete. For edge labeling, a user may manually identify specific edges in the images as having particular edge classifications. For example, edges may be labeled as tooth edges, gingival edges, orthodontic aligner edges, overlapping tooth and aligner edges, and so on. Unlabeled edges may be automatically assigned a miscellaneous edge classification or label. To label edges users may highlight edges and associate the highlighted edges with particular edge labels. In one embodiment, a user selects an edge label and/or a color, and traces one or more edges with the edge label and/or color selected. The user may then select another edge label and/or color, and may trace one or more additional edges with the other edge label and/or color selected. This process may be repeated until all of the desired edges are labeled. In one embodiment, incisal edges of teeth and gingival edges are labeled, but edges of interproximal regions of teeth are not labeled. In one embodiment, edges of aligners (e.g., incisal edges of aligners) are labeled. In one embodiment, interproximal edges of teeth are labeled as well as incisal edges and gingival edges of teeth. In one embodiment, each individual tooth is assigned a separate edge label based on the identity of the tooth (e.g., tooth 1, tooth 2, tooth 3, and so on). Note that images may contain front view images and/or side view images of teeth.

Figure 9A:
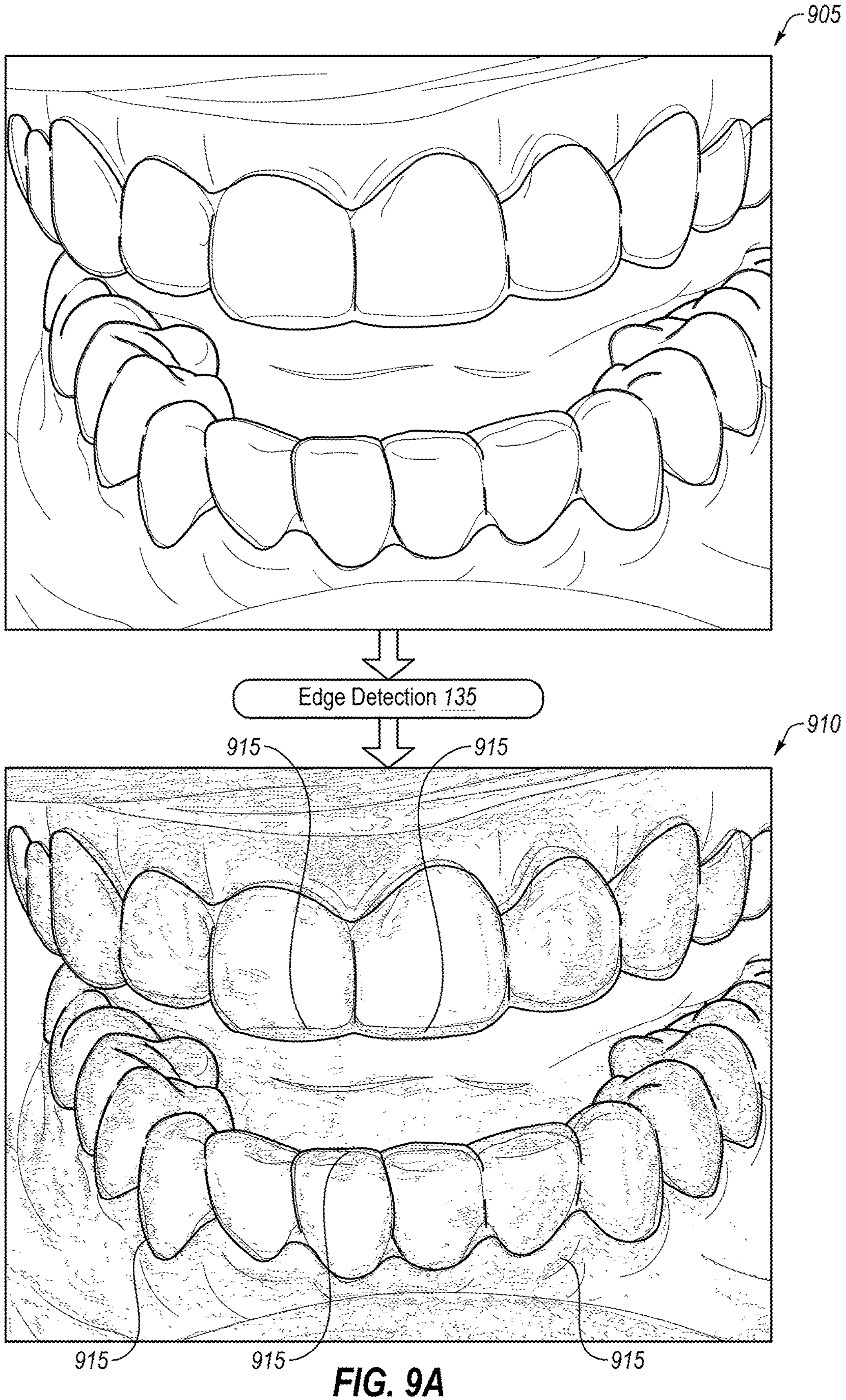
FIG. 9A illustrates edge detection of an image that contains teeth, in accordance with an embodiment.

FIG. 9A illustrates edge detection 135 of an image 905 that contains teeth, in accordance with an embodiment. As shown, a starting image 905 is input into an edge detection 135 algorithm, and an output image 910 with edges 915 is produced.

Figure 9B:
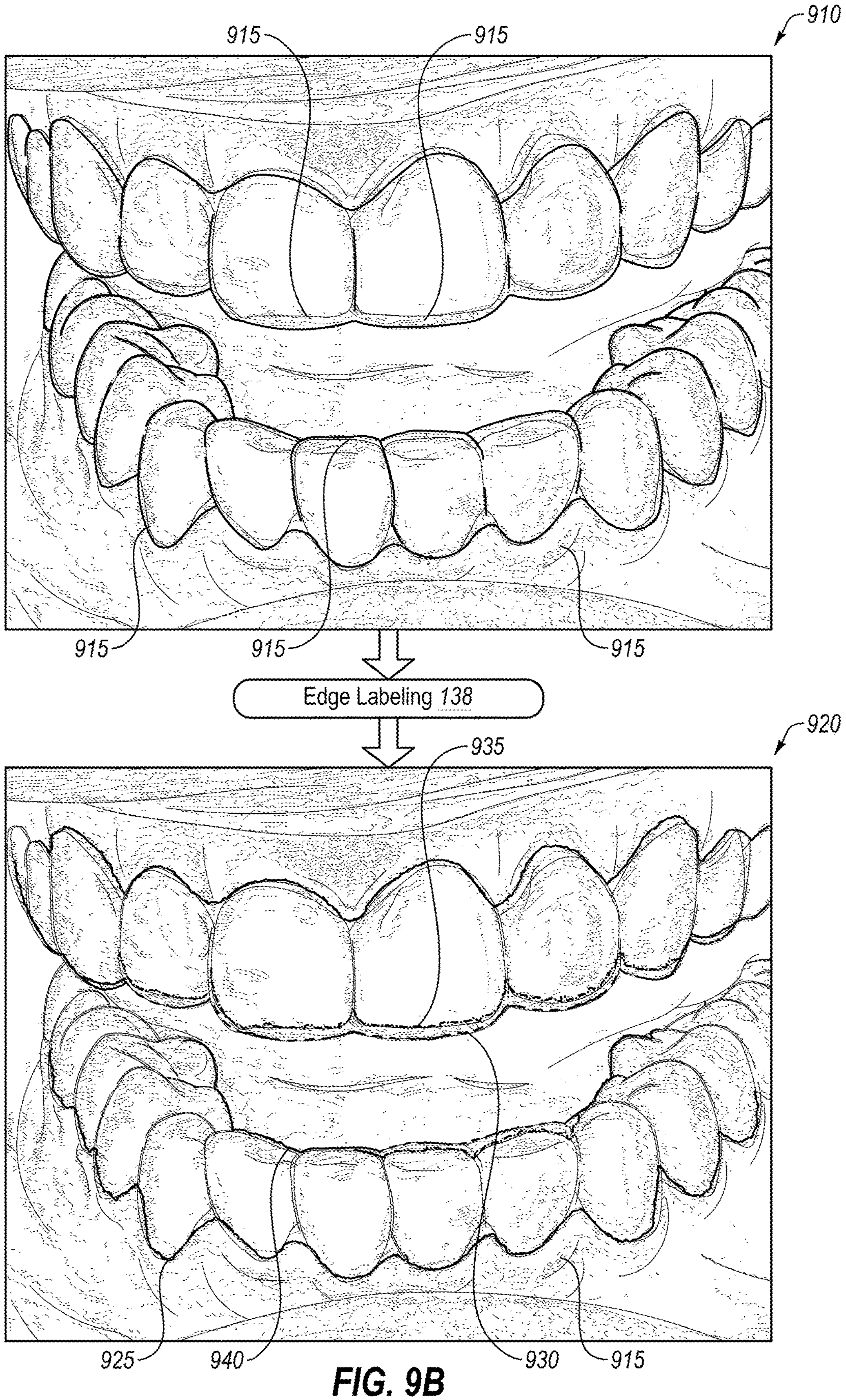
FIG. 9B illustrates labeling of edges of an image that contains teeth, in accordance with an embodiment.

FIG. 9B illustrates labeling of edges of an image that contains teeth, in accordance with an embodiment. As shown, an image 910 with edges 915 is labeled via edge labeling 138 to produce image 920 with labeled edges. The labeled edges in this example include an aligner edge 930, a tooth edge 935, a gingival edge 925, an overlapping tooth and aligner edge 940 and miscellaneous edges 915. As shown, the interproximal edges of teeth are not labeled. Rather, edge labeling has been limited to gingival edges 925, tooth incisal edges 935, aligner edges 930 and combined tooth and aligner edges 940. However, in other embodiments the incisal tooth edges may also be labeled. The incisal tooth edges may be assigned the same tooth edge label as the incisal tooth edge or a distinct interproximal tooth edge label, depending on the application. Also, other edge labeling may be used in other embodiments. For example, in an embodiment only tooth edges may be labeled, which may or may not include gingival tooth edges (where the tooth and gingiva meet, also referred to as gingival edges), incisal tooth edges and/or interproximal tooth edges, which may all be assigned the same tooth edge label or separate tooth edge labels.

Returning again to FIG. 1, after edge labeling 138, a second untrained machine learning model is trained using the training dataset 110 that includes cropped images of teeth with labeled edges. The second machine learning model may be a second deep learning model. In one embodiment, the second deep learning model is a convolutional neural network. The second deep learning model may be trained to create a classifier that labels relevant edges and/or that more accurately identifies edges. For example, edge detection algorithms such as MCG may be 1-2 pixels off in some instances. The second machine learning model 140 may be trained to identify an actual edge from a rough edge determined using a standard edge detection algorithm, and to then classify that actual edge.

In one embodiment, the second machine learning model is trained to determine, for a region of interest (ROI), whether a central pixel of the ROI is an edge pixel and/or a label for that edge pixel. In such an embodiment, the second machine learning model is trained based on ROIs generated from a training dataset. Accordingly, multiple ROIs may be generated for each image of the training dataset, and each ROI may be separately input into the machine learning model to train the machine learning model.

Figure 10:
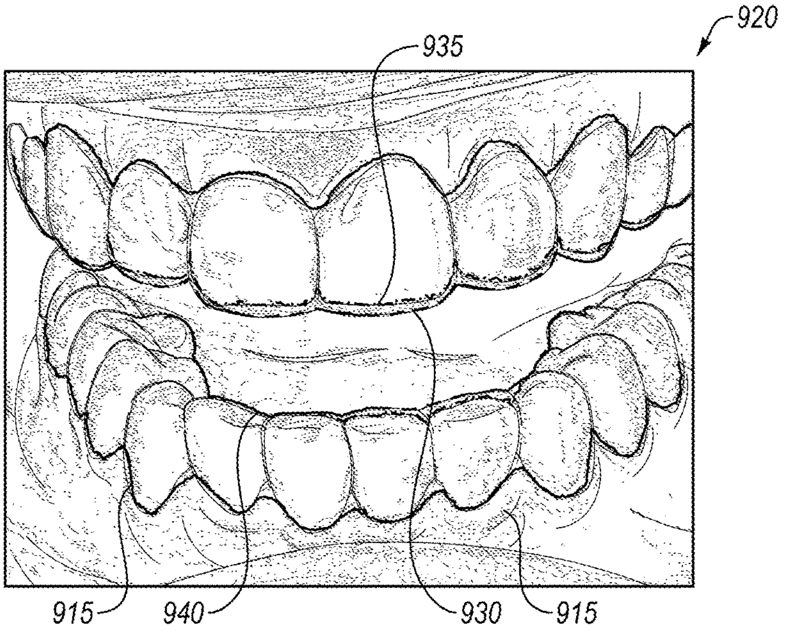
FIG. 10 illustrates the generation of regions of interest (ROIs) from an image with labeled edges, in accordance with an embodiment.
Figure 10:
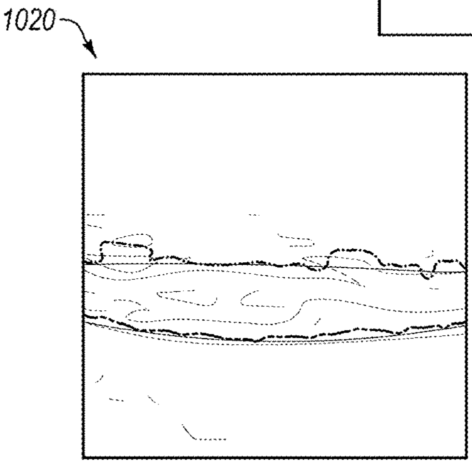
Figure 10:
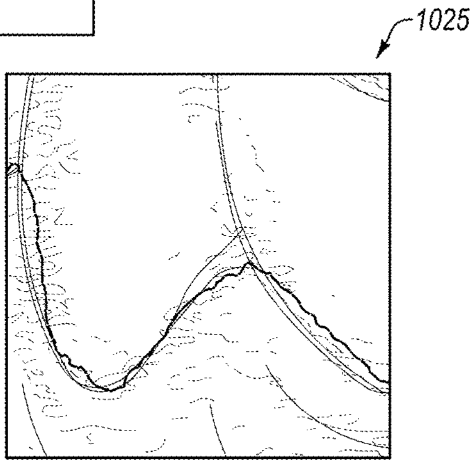

FIG. 10 illustrates a method 1000 for the generation of regions of interest (ROIs) from an image with labeled edges, in accordance with an embodiment. At block 1005 of method 1000, processing logic receives an image with labeled edges. In the illustrated example, image 920 is shown, which is a cropped image of teeth that has been labeled with a tooth edge 930, a gingival edge 925, an aligner edge 930 and an overlapping tooth and aligner edge 940.

At block 1010, processing logic may subsample the edge pixels from the image. Subsampling the edge pixels may include selecting a subset of the edge pixels for the generation of ROIs. Since there are many images in the training dataset, and many ROIs may be generated from each image, the number of data points to input into a machine learning model may be reduced by subsampling without significantly impacting the training of the machine learning model. Subsampling may be performed by walking along each edge and selecting every nth pixel (e.g., every $5^{th}$ pixel) along the edge. Alternatively, subsampling may be performed using a random number generator or pseudorandom number generator to select pixels of available edge pixels to be central pixels for ROIs. In one embodiment, ROIs are also generated with central pixels that are not edge pixels in additional to being generated with central pixels that are edge pixels.

At block 1015, multiple ROIs are generated from the image. Each ROI may be an image patch having a fixed size, where a central pixel of the image patch is an edge pixel for a labeled edge or an unlabeled edge. In embodiments, the ROIs may be square or rectangular image patches such as 16×16 pixel patches, 32×32 pixel patches, 16×32 pixel patches, 32×16 pixel patches, 64×64 pixel patches, and so on. Notably, the ROIs may have overlapping image data. For example, a first ROI may be based around pixel at column 20, row 20, and may be a 30×30 image patch centered on the pixel at column 20, row 20. A second ROI may be based around pixel at column 22, row 20, and may be a 30×30 image patch centered on the pixel at column 22, row 20. Accordingly, there will be a large overlap of pixels between these two ROIs.

A first zoomed in ROI 1020 and a second zoomed in ROI 1025 are shown as examples. In the illustrated examples, a central pixel of the first ROI 1020 is a tooth edge pixel and a central pixel of the second ROI 1025 is a gingival edge pixel. Accordingly, the first ROI 1020 may be an example of an ROI that represents a tooth edge and the second ROI 1025 may be an example of an ROI that represents a gingival edge.

Figure 11:
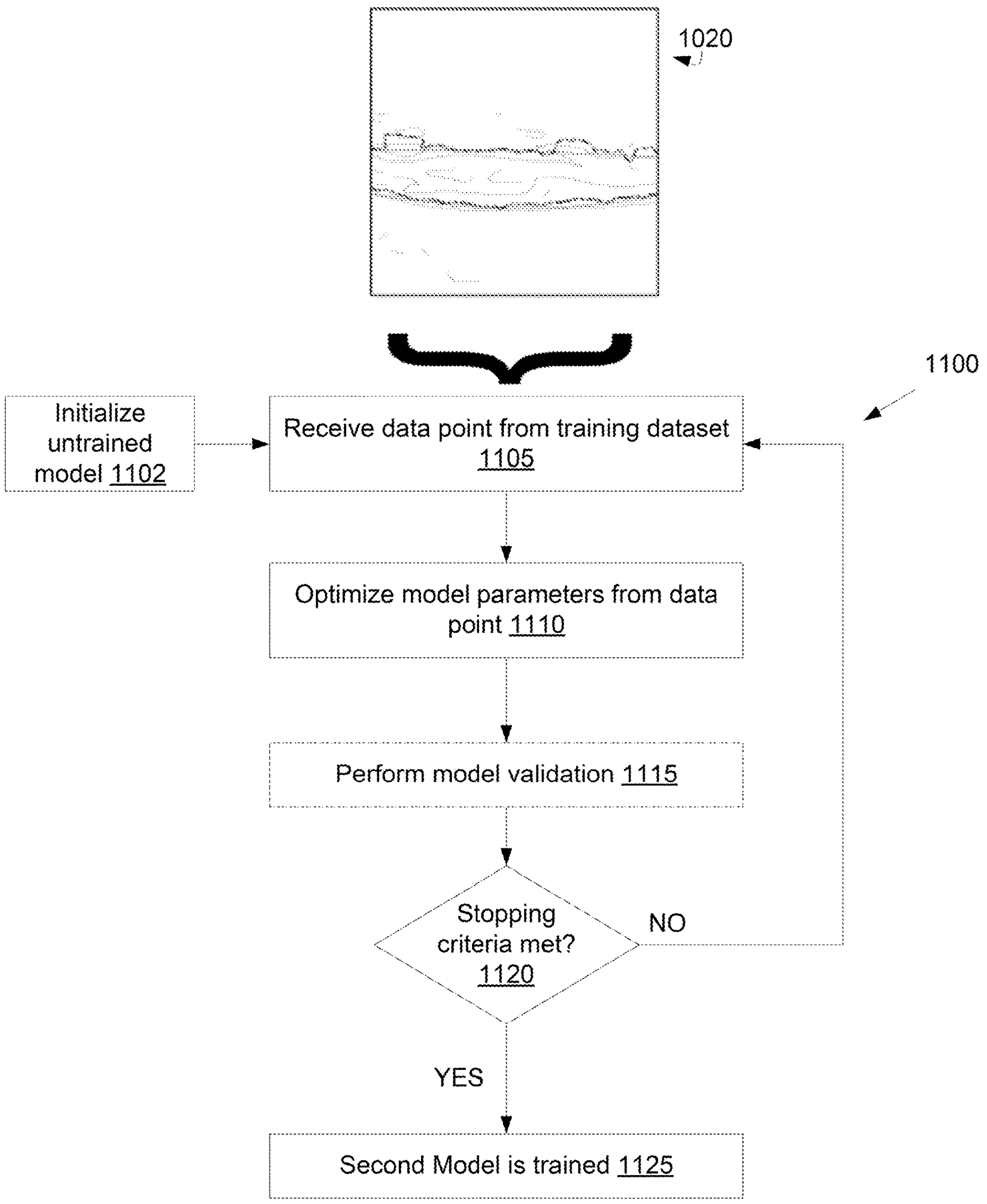
FIG. 11 illustrates a flow diagram for a method of training a machine learning model to label edges in images containing teeth, in accordance with an embodiment.

FIG. 11 illustrates a flow diagram for a method 1100 of training a machine learning model to label edges in images of teeth, in accordance with an embodiment. At block 1102 of method 1100, an untrained machine learning model is initialized. The machine learning model that is initialized may be a deep learning model such as an artificial neural network. One type of artificial neural network that may be initialized and then trained is a convolutional neural network. Initialization of the artificial neural network may include selecting starting parameters for the neural network. The solution to a non-convex optimization algorithm depends at least in part on the initial parameters, and so the initialization parameters should be chosen appropriately. In one embodiment, parameters are initialized using Gaussian or uniform distributions with arbitrary set variances. In one embodiment, the artificial neural network is initialized using a Xavier initialization.

At block 1105, the untrained machine learning model receives a first data point from a training dataset. The first data point may be, for example, ROI 1020. At block 1110, processing logic optimizes parameters of the machine learning model from the data point. The machine learning model applies a classification or label to the image based on its current parameter values. An artificial neural network includes an input layer that consists of values in a data point (e.g., RGB values of pixels in the ROI 1020). The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class. For the artificial neural network being trained, there is a separate class for each of the types of edge labels. The edge labels may include a tooth edge class, an aligner edge class, a gingival edge class, an overlapping tooth and aligner edge class, a miscellaneous edge class, an incisal tooth edge class, an interproximal tooth edge class, and/or other edge labels. A probability that the central pixel in the ROI belongs to each class is computed. For example, the artificial neural network might determine that there is a 30% probability that the central pixel of ROI 1020 is an aligner edge, a 30% probability that the central pixel of ROI 1020 is a tooth edge, a 30% probability that the central pixel of ROI 1020 is a gingival edge, and a 10% probability that the central pixel of ROI 1020 is some other class of edge.

Processing logic compares the classification or label to the provided classification or label (in this case the provided ROI indicates that the central pixel is 100% probability tooth edge, 0% probability aligner edge, 0% probability gingival edge, and 0% probability some other edge class) to determine a classification error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed at block 1115 to determine whether the model has improved and to determine a current accuracy of the deep learning model. At block 1120, processing logic determines whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. If the stopping criteria is not met, the method returns to block 1105 and another data point (e.g., ROI) is input into the machine learning model for further training. If the stopping criteria has been met, the method continues to block 1125 and a second machine learning model is trained. As noted herein, the second machine learning model may be an artificial neural network (or other deep learning model) such as a convolutional neural network. However, other types of machine learning models may also be used.

The machine learning model that is trained will output, for an input image, labels of edges in the input image. This may include generating a matrix that indicates for each entry in the matrix whether the entry represents an edge pixel and/or whether that edge pixel is a tooth edge, a gingival edge, an aligner edge, etc.

Returning again to FIG. 1, once the second machine learning model (deep learning model) is trained, that trained machine learning model is stored in model storage 145.

Figure 8:
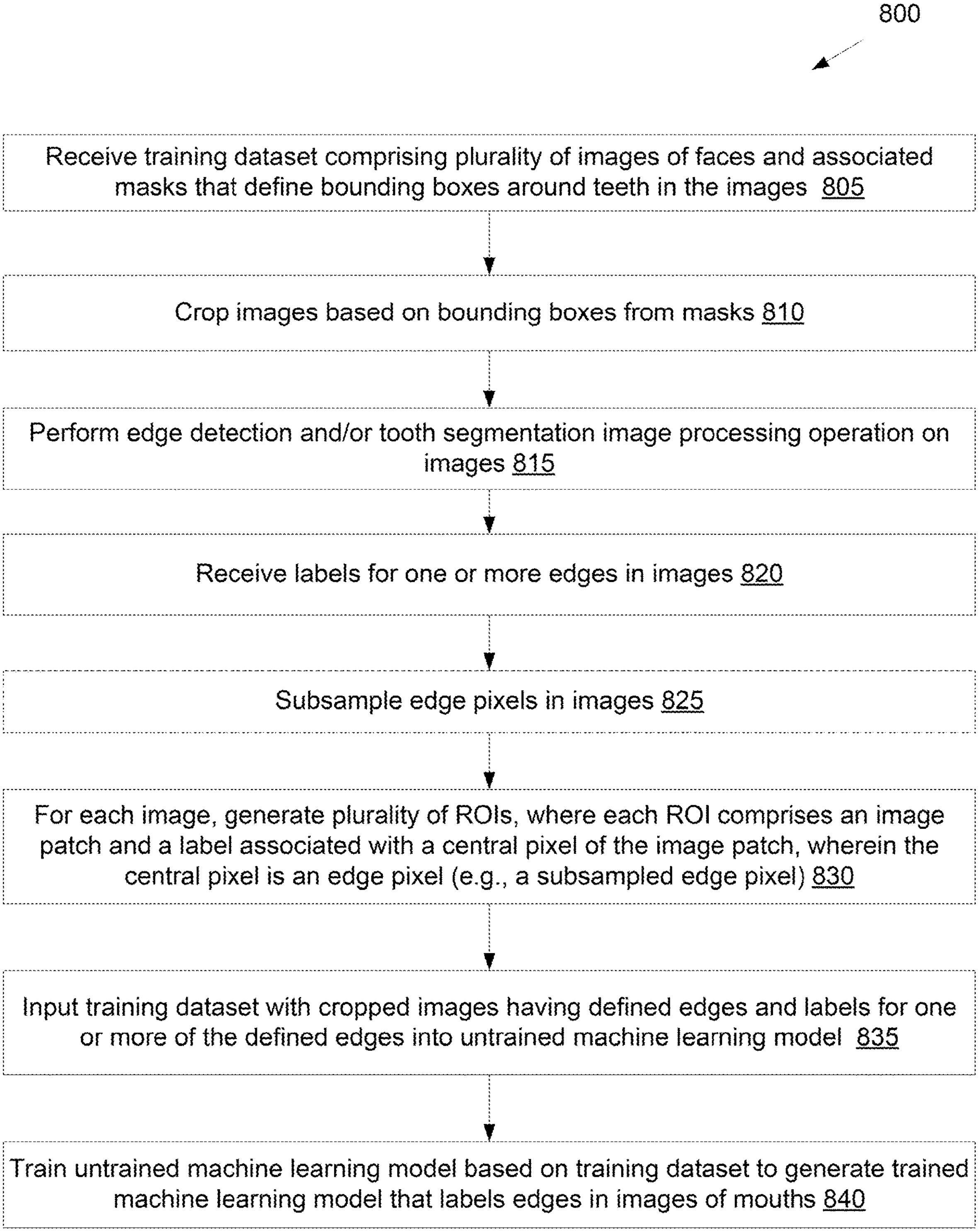
FIG. 8 illustrates a flow diagram for a method of training a machine learning model to label edges in images that contain teeth, in accordance with an embodiment.

FIG. 8 illustrates a flow diagram for a method 800 of training a machine learning model to label edges in images that contain teeth, in accordance with an embodiment. Method 800 may include operations of image cropping 130, edge detection 135, edge labeling 138 and training of the second machine learning model 140 set forth in FIG. 1 in some embodiments. At block 805 of method 800, processing logic receives a training dataset comprising a plurality of images of faces and associated masks that define bounding boxes around teeth in the images. At block 810, processing logic crops the images based on the bounding boxes from the masks 810. At block 815, processing logic performs edge detection and/or segmentation on the cropped images using one or more image processing algorithms. At block 820, processing logic receives labels for edges in the images.

At block 825, processing logic may subsample edge pixels and/or other pixels in the images of the training dataset. At block 830, processing logic may then generate ROIs from the edge pixels and/or from the subsampled edge pixels. In one embodiment, for each image, processing logic generates a plurality of ROIs. Each ROI comprises an image patch and a label associated with a central pixel of the image patch. The central pixel is an edge pixel (e.g., a subsampled edge pixel). The label associated with the central pixel may be, for example, one of a tooth edge, an aligner edge, a gingival edge, an overlapping tooth and aligner edge, or a miscellaneous edge.

At block 835, processing logic inputs the training dataset with the cropped images having the defined edges and labels for one or more of the defined edges into the machine learning model. In one embodiment, processing logic inputs the generated ROIs into the machine learning model one ROI at a time. The machine learning model may be updated slightly after each ROI is input. After thousands to millions of ROIs have been input, the machine learning model may be a trained machine learning model that may label edges of images of mouths (block 840). In one embodiment, the trained machine learning model is trained to receive an image patch and determine whether a central pixel of the image patch is an edge pixel and/or a type of label to assign to the edge pixel.

Returning again to FIG. 1, the model application workflow 147 begins with receipt of a new image 150. The new image may be an image of a face and/or another image that contains teeth. The new image 150 may be a front view or side view image. In one embodiment, the new image 150 is a two-dimensional (2D) image. The new image 150 is input into the first trained machine learning model 155 (e.g., first deep learning model that defines a bounding box around teeth in images).

Figure 6:
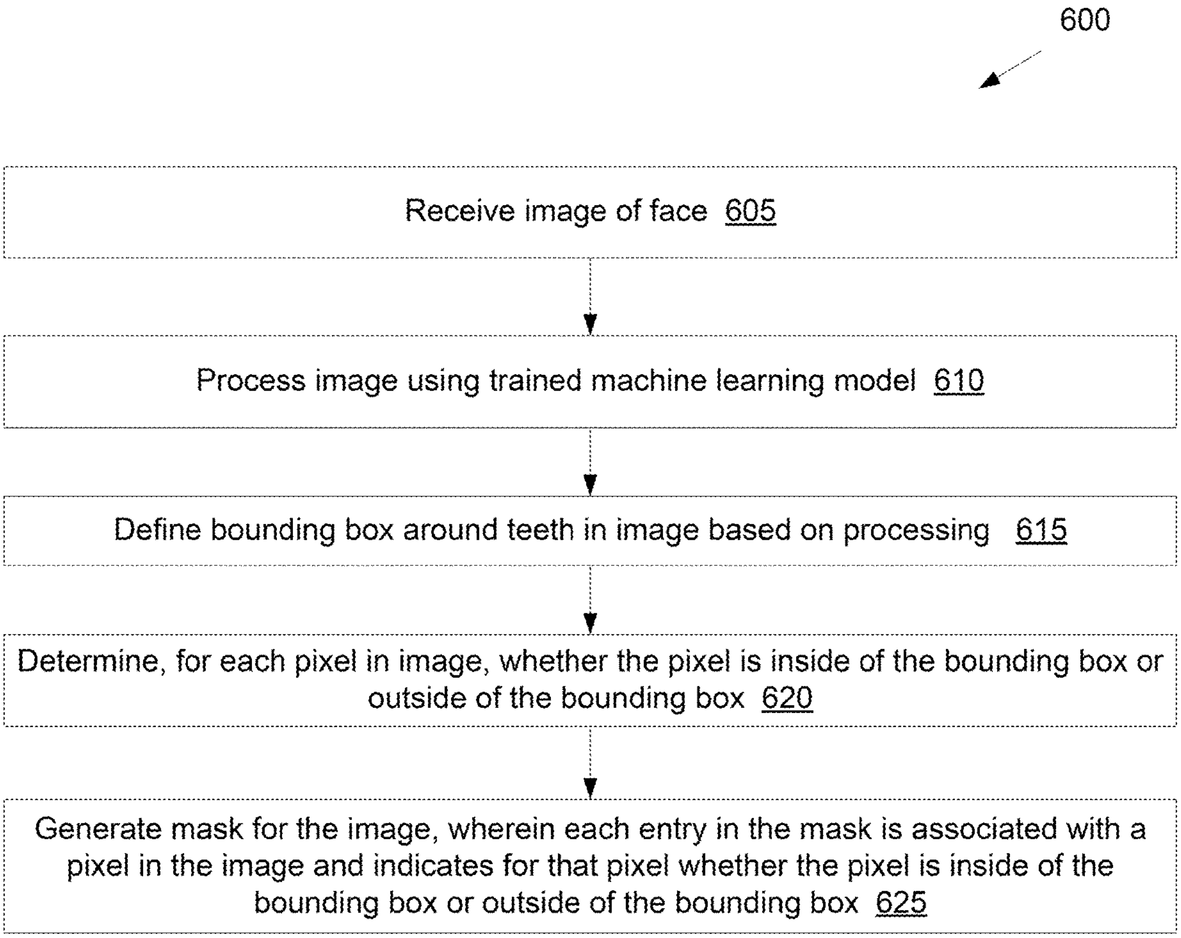
FIG. 6 illustrates a flow diagram for a method of determining a bounding box around teeth in an image using a trained machine learning model, in accordance with an embodiment.

FIG. 6 illustrates a flow diagram for a method 600 of determining a bounding box around teeth in an image using a trained machine learning model, in accordance with an embodiment. At block 605 of method 600, processing logic receives an image of a face. At block 610, processing logic processes the image using a trained machine learning model. The machine learning model may be a deep neural network such as a u-net or SDD that has been trained to place bounding boxes around one or more regions of teeth in an image. At block 615, processing logic defines one or more bounding box around teeth in the image based on the processing. In one embodiment, the machine learning model defines a single bounding box around all teeth in the image. In one embodiment, the machine learning model additionally or alternatively defines bounding boxes around different regions or collections of teeth in the image. For example, for an occlusal view image of a patient's mouth, the machine learning model may define a first bounding box around anterior teeth in the image, a second bounding box around left posterior teeth in the image and/or a third bounding box around right posterior teeth in the image. Additionally, the machine learning model may label each of the bounding boxes with an appropriate label (e.g., anterior teeth, left posterior teeth, right posterior teeth, etc.). In some embodiments, the machine learning model is further able to identify and label teeth as being teeth of the mandible or teeth of the maxilla.

Different types or views of images of teeth may be input into the machine learning model, and the machine learning model may be trained to distinguish between the different types of images and to generate appropriate bounding boxes around teeth in each of the types of images. For example, the machine learning model may be trained to classify an image of teeth as an occlusal view of the maxillary dental arch, as an occlusal view of a mandibular dental arch, as a front view of anterior teeth, as a left side view of teeth, as a right side view of teeth, and so on.

In one embodiment, the machine learning model is able to generate the following types of bounding boxes:

1) left/right posterior teeth on upper/lower occlusal views;
2) lower/upper anterior teeth on occlusal views;
3) all teeth in full lower jaw view;
4) all teeth in full upper jaw view;
5) all teeth in anterior view;
6) all teeth in left/right view;
7) teeth in a plaster model;
8) no bounding box (no teeth in view).

Each of the types of bounding boxes may include appropriate labels classifying the bounding boxes.

In further embodiments, separate bounding boxes may be defined around each tooth, and the bounding boxes may each be labeled with an identifier for the bounded tooth (e.g., tooth 1, tooth 2, etc.). This may enable precise localization of particular teeth. Additionally, features of each tooth may be assessed by further processing logic and/or machine learning models.

For anterior, left and right views, the machine learning model may predict a single bounding box with a corresponding class (e.g., a label of anterior teeth, left teeth, right teeth, etc.). For each occlusal view, the machine learning model may output at least 4 bounding boxes in one embodiment, including a left posterior teeth bounding box, a right posterior teeth bounding box, an anterior teeth bounding box, and a full jaw bounding box.

In some embodiments, the machine learning model outputs a confidence metric associated with each generated bonding box. If the confidence metric is below a confidence threshold, then further automated processing may not be performed in some embodiments. If the confidence metric is above the confidence threshold, then further automated processing of the image may be performed.

In one embodiment, processing logic combines multiple bounding boxes (e.g., performs a union of two or more bounding boxes). In one embodiment, processing logic determines for one or more bounding boxes whether those bounding boxes have an associated confidence metric that exceeds a confidence threshold. If a bounding box has a confidence metric that is below the confidence threshold, then that bounding box may not be combined with other bounding boxes. If some or all of the bounding boxes considered have associated confidence metrics that exceed the confidence threshold, then those bounding boxes with confidence metrics that exceed the confidence threshold may be combined.

At block 620, processing logic may determine, for each pixel in the image, whether the pixel is inside of the bounding box (or inside of one of multiple bounding boxes) or outside of the bounding box (or outside of multiple bounding boxes). In one embodiment, processing logic determines for each pixel whether that pixel is inside of the combined bounding box or outside of the combined bounding box.

At block 625, processing logic may generate a mask for the image. Each entry in the mask is associated with a pixel in the image and indicates for that pixel whether the pixel is inside of the bounding box or outside of the bounding box. In one embodiment, at block 625, processing logic generates multiple masks for the image, where each mask may correspond to one of multiple defined bounding boxes. In one embodiment, processing logic determines a union of two or more bounding boxes, and generates a mask for the combined area within each of the bounding boxes used to form the union. In one embodiment, bounding boxes that have a confidence metric that exceeds a confidence threshold are combined to form a mask. The operations of blocks 615-625 may be performed by a deep learning model as a sequence of operations or as one or more combined operations.

In some embodiments, the machine learning model is further trained to determine a quality metric for the image, where the quality metric indicates a probability that the image is appropriate for further processing (e.g., to assess a patient's dentition). Processing logic may determine whether the image has a quality metric that exceeds a quality threshold. If the image's quality metric meets or exceeds the quality threshold, then the image may be further processed (e.g., by performing a case assessment for the patient). If the image's quality metric is below the quality threshold, then the image may be discarded.

Additionally, a dental practitioner may be notified that the image is being discarded and optionally a reason for the image being discarded (e.g., too blurry, too dark, insufficient teeth shown, etc.). In such embodiments, the machine learning model may output classifiers of each category of image rejection. For example, an image that is both dark and blurry may be labeled with a "too dark" label and a "too blurry label." An image that has been labeled with any label associated with a deficient image (e.g., too dark, too blurry, insufficient teeth, no teeth, etc.) may have a quality metric that is below the quality threshold.

In some embodiments, the machine learning model is further trained to determine one or more of the following articles of information:

1) whether all necessary teeth for assessment of a patient are presented in the image;
2) whether an image was labeled as a particular view, but the machine learning model classified the image as a different type of model (indicating that a dental practitioner may have mislabeled the image)
3) whether the image is relevant for assessment of the patient's dentition.

Each of the above types of information may be associated with a quality metric defined for the image, and may be reported out to a dental practitioner. For example, if an image does not include all teeth necessary for assessment of the patient, a notice of such may be output. If the image was manually labeled as a particular view but was identified by the machine learning model as a different view, this may be indicated to the dental practitioner. If the image is not an image of a patient's teeth (e.g., is of a typodont), then this information may be output to the dental practitioner.

Alternatively, the output of the machine learning model (e.g., the bounding boxes and/or masks) may be used to crop the image, and the cropped image may be input into another machine learning model that has been trained to determine one or more of the above articles of information.

Method 600 may be performed to automatically process images of teeth to a) localize teeth on incoming images for making a more precise automatic assessment of a patient's dentition, b) filter out non-relevant images and/or images of low quality (e.g., images for which not all teeth are visible, images for which teeth are partly occluded by lips or fingers, images that are too dark or blurry, images with no teeth presented, etc.), c) filter out and/or identify situations where a dental practitioner confuses views (e.g., submits a lower occlusal view instead of an upper occlusal view for an assessment of the upper dental arch), d) filter out cases in which an image is taken too far from a patient and the size of a resulting bounding box is too small for making a proper assessment, and/or e) filter out images that do not contain real teeth (e.g., images of typodonts or plaster models). Other classes of reasons that images are rejected from further processing and/or assessment may also be used.

Figure 7A:
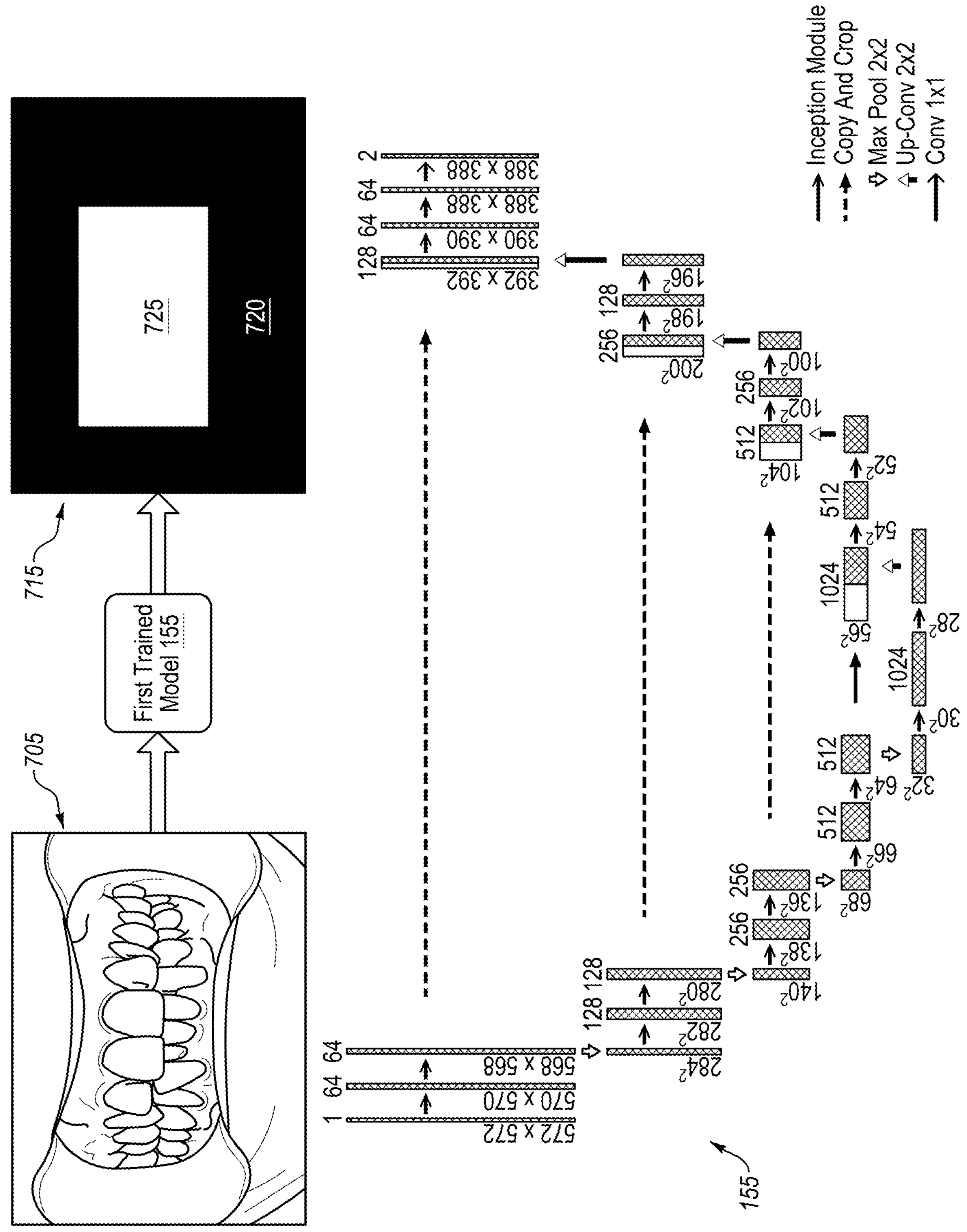
FIG. 7A illustrates a u-net with an inception model that has been trained to determine a bounding box around teeth in an image, in accordance with an embodiment.

FIG. 7A illustrates processing of an image 705 by a first trained machine learning model 155. The first trained machine learning model 155 in one embodiment is a u-net with an inception model that has been trained to determine a bounding box around teeth in an image, in accordance with an embodiment. A u-net is a convolutional neural network for fast and precise segmentation of images. An alternative to a u-net that may be used in one embodiment is a sliding-window convolutional network or an SSD. The first trained machine learning model 155 receives an image containing teeth (e.g., an image of a face) such as image 705. The various layers of the u-net process the image of the face sequentially. This may include an inception module processing image data from the image 705 at one or more layers. An inception module is essentially a small machine learning model within a larger machine learning model. An inception module may perform multiple different convolutions in parallel, and may output the results of the multiple different convolutions (e.g., the result of a 1×1 convolution, the result of a 3×3 convolution, the result of a 5×5 convolution, and so on).

The machine learning model 155 may be a u-net that slices an input image into various sized slices at various layers of the machine learning model 155. Each slice represents an image, with the number on the left of the slice representing a size and the number on top of the slice representing a number of channels. Arrows represent mathematical operations applied to the image. A first (inception module) horizontal arrow connecting slices represents an inception module used to transition between slices or layers, where the inception module is a mini network composed of computational logics, and where the output image stays the same as the input image. A second (copy and crop) horizontal arrow represents copying and cropping of a slice between layers. A downward arrow (max pool 2×2) is roughly a 4:1 down-sampling operation. An upward arrow (up-conv 2×2) is roughly a 1:4 up-sampling operation. The final horizontal arrow (conv 1×1) does not change the image in size but reduces a number of channels by performing a convolution across the channel.

An output of the first trained machine learning model 155 is a binary mask 715 that has a same size as the new image 705. For example, the binary mask 715 has a number of rows and columns that equals a number of vertical pixels and horizontal pixels in the image 705. Each entry in the binary mask corresponds to a pixel in the image 705 and has a first value 725 if the pixel is inside of a bounding box that defines a teeth region in the image 705 and a second value 720 if the pixel is outside of the bounding box. Accordingly, the mask includes a first region having the first value 725 and a second region having the second value 720.

Figure 7B:
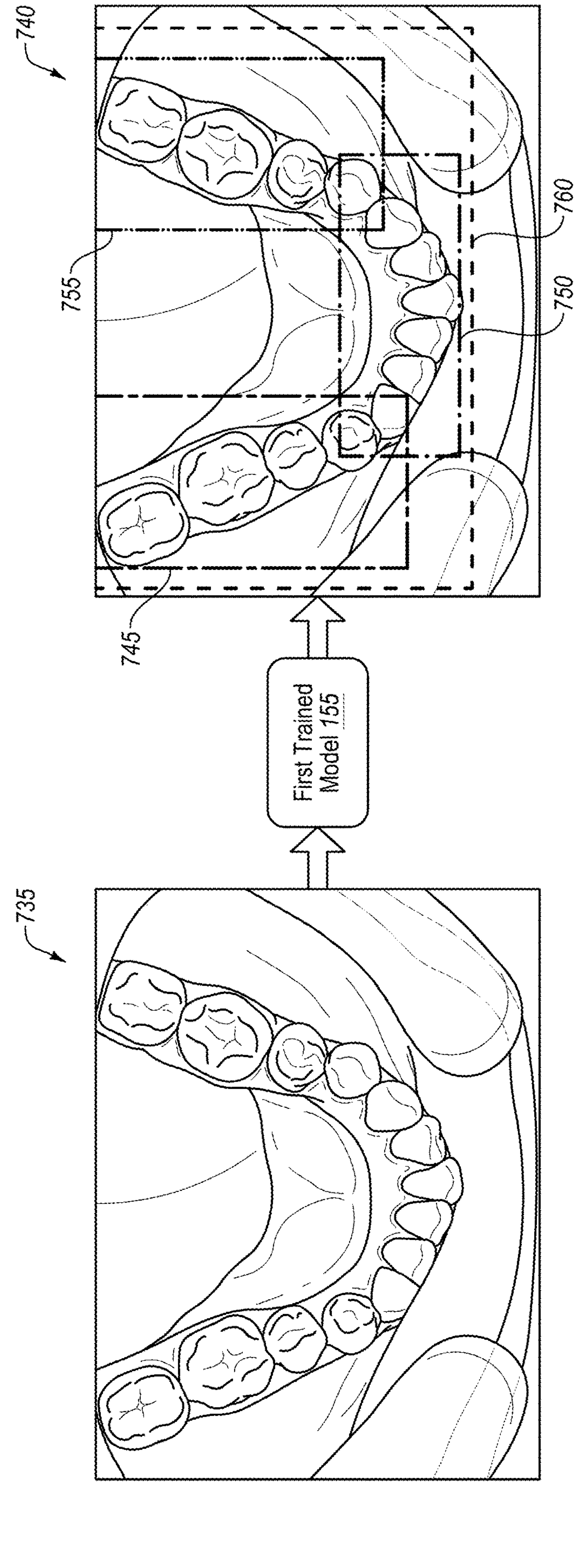
FIG. 7B illustrates a machine learning model that generates a plurality of bounding shapes around different regions of teeth in an image of a mouth, in accordance with one embodiment.

FIG. 7B illustrates a machine learning model 155 that has been trained to generate a plurality of bounding shapes around different regions of teeth in an image 735 of a mouth, in accordance with one embodiment. As shown, image 735 may be input into the first trained machine learning model 155. The image may be an occlusal view image of a dental arch, and the first trained model 155 may be trained to generate multiple bounding boxes for occlusal view images. The first trained machine learning model 155 (e.g., a deep neural network such as those described above) may then output a set of bounding boxes around different teeth regions in the occlusal view image 735. In the illustrated embodiment, the first trained machine learning model 155 outputs an anterior bounding box 750, a left (patient's left) posterior bounding box 755, a right (patient's right) posterior bounding box 745 and a dental arch bounding box 760.

One or more of the bounding boxes shown in FIG. 7B may be used to generate a mask, as discussed above. In embodiments, a single mask may be generated for a union or other combination of multiple bounding boxes. Alternatively, or additionally, multiple masks may be generated, where each mask is for a particular bounding box or combination of bounding boxes. In one embodiment, the output of the machine learning model 155 includes such a mask (or set of masks). Each mask may be a binary mask, where each pixel of the binary mask represents a pixel of the input image and has a first value if the pixel is within a given bounding box (or set of bounding boxes) and a second value if the pixel is outside of a given bounding box (or set of bounding boxes).

Figure 7D:
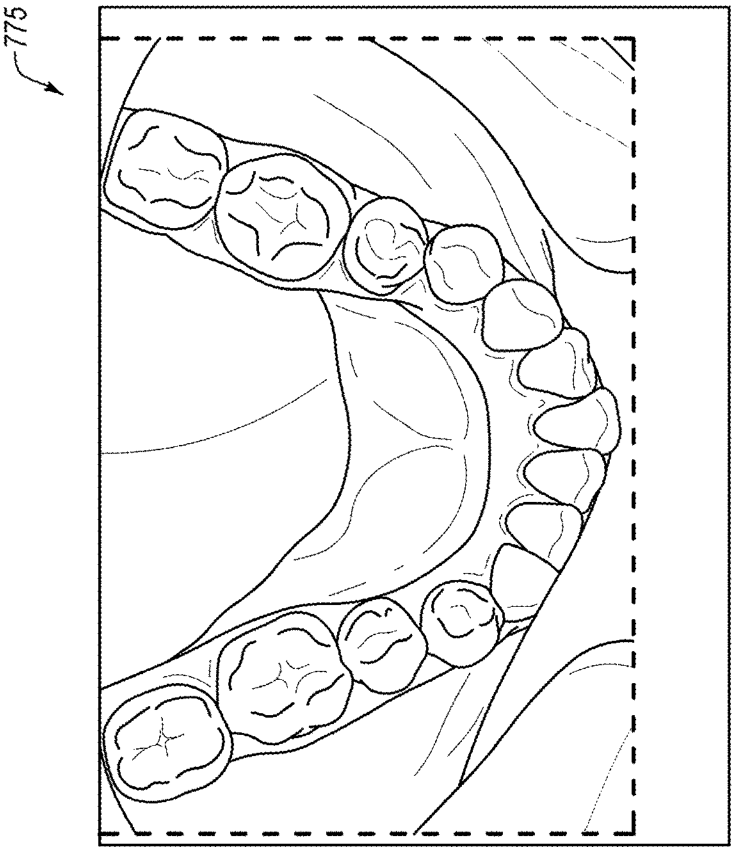
FIG. 7D illustrates a second cropped image that has been cropped based on use of the bounding shapes shown in FIG. 7B.
Figure 7C:
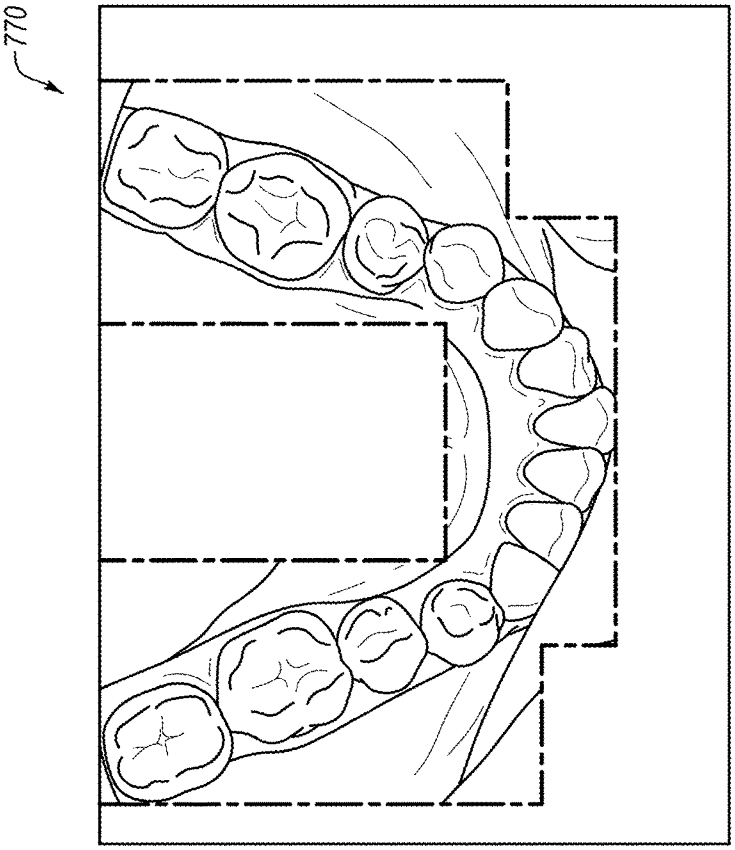
FIG. 7C illustrates a first cropped image that has been cropped based on use of the bounding shapes shown in FIG. 7B.

Returning again to FIG. 1, after the new image 150 has been processed by the first trained machine learning model 155, the image is cropped (block 158) based on one or more masks generated from one or more defined bounding boxes. Those pixels that are inside of the bounding box remain in the cropped image, while those pixels that were outside of the bounding box are cropped such that they are not included in the cropped image. Two examples of cropped images are illustrated in FIGS. 7C-D. FIG. 7C illustrates a first cropped image 770 that has been cropped based on use of a mask that is a union of the anterior bounding box 750, the left posterior bounding box 755 and the right posterior bounding box 745 shown in FIG. 7B.

FIG. 7D illustrates a second cropped image 775 that has been cropped based on use of the dental arch bounding box 760 shown in FIG. 7B.

Returning again to FIG. 1, edge detection 160 is then performed on the cropped image. The edge detection 160 may be performed using any standard edge detection algorithm, such as those previously mentioned. In addition to or instead of performing edge detection at block 160, processing logic may perform segmentation at block 160.

The cropped image with edge detection data and/or segmentation data is input into the second trained machine learning model (e.g., a second deep learning model). This may include generating ROIs from the cropped image, and inputting the ROIs into the second trained model. The second trained machine learning model 165 may then output the image with labeled edges and/or may output labeled edges for the image (block 170).

Figure 12:
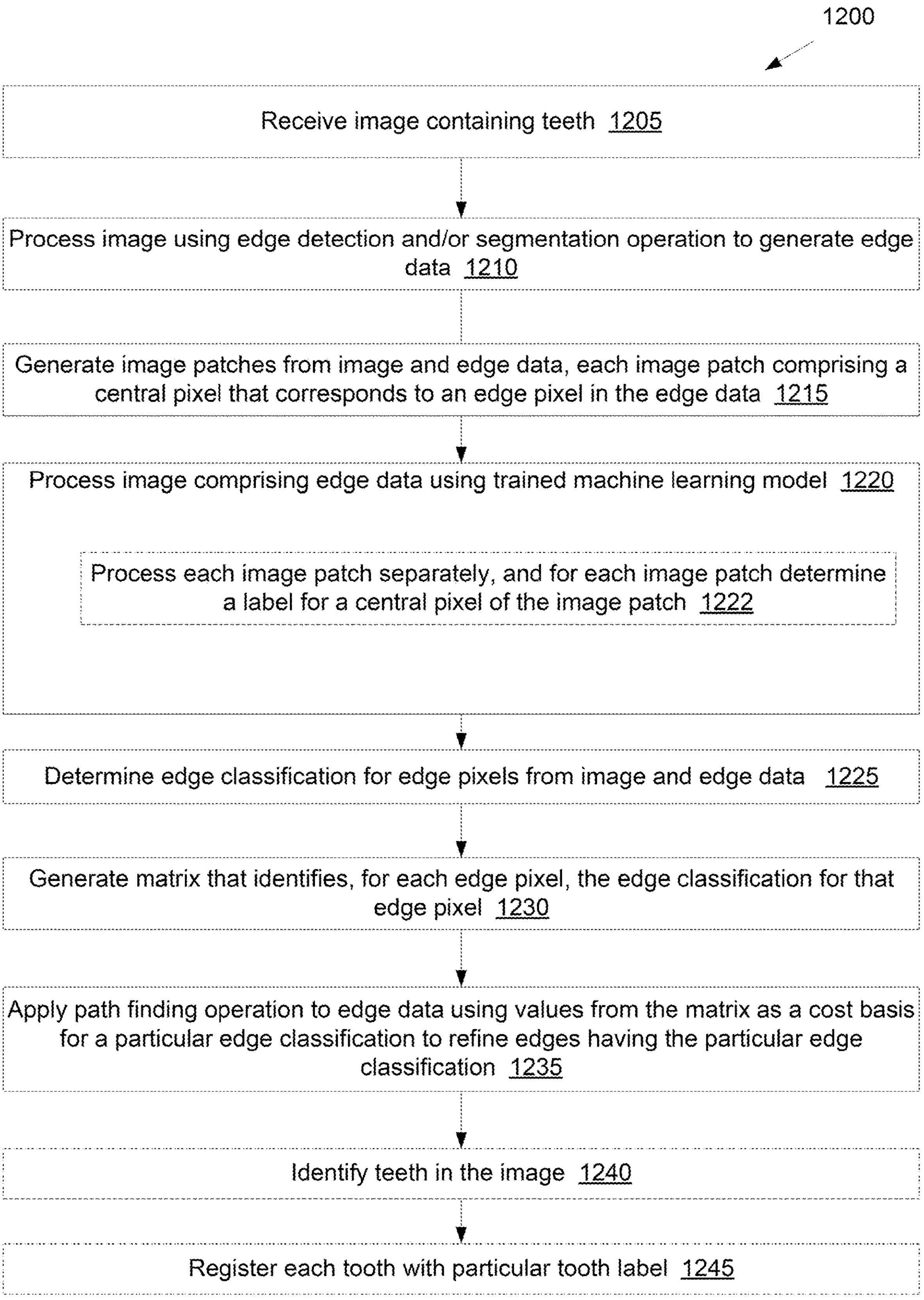
FIG. 12 illustrates a flow diagram for a method of labeling edges in an image containing teeth, in accordance with an embodiment.

FIG. 12 illustrates a flow diagram for a method 1200 of labeling edges in an image containing teeth, in accordance with an embodiment. At block 1205 of method 1200, processing logic receives an image containing teeth (e.g., a cropped image of a teeth region that was cropped based on an output of a previous machine learning model). At block 1210, processing logic processes the image using an edge detection and/or segmentation operation or algorithm to generate edge data.

At block 1215, processing logic generates patches from the image and edge data. Each image patch may comprise a central pixel that corresponds to an edge pixel in the edge data. Alternatively, a separate image patch may be generated for each pixel in the image, where each image patch has that pixel as a central pixel. The image patches may be ROIs for the image, and may have a predefined size. Some example sizes for image patches are 16×16 pixels, 32×32 pixels, 64×64 pixels, 128×128 pixels, 20×20 pixels, 30×30 pixels, 50×50 pixels, and so on. Additionally, image patches may be rectangular rather than square in shape, with a greater number of horizontal pixels than vertical pixels or a greater number of vertical pixels than horizontal pixels. Image patches may be overlapping. Accordingly, the same pixels may be included in many different image patches.

At block 1220, processing logic processes the image comprising the edge data using a trained machine learning model (e.g., a trained deep learning model such as an artificial neural network) that has been trained to label edges in images of teeth. In one embodiment, each of the image patches is input separately into the machine learning model, and the machine learning model makes a separate determination for each image patch as to whether a central pixel in the image patch is an edge pixel and/or an edge pixel classification for the central pixel in the image patch. In one embodiment, the machine learning model is trained to classify edges as teeth edges, aligner edges, gingival edges, overlapping teeth and aligner edges, and/or other edges. In one embodiment, the machine learning model is trained to classify edges as tooth edges, aligner edges or other edges. In one embodiment, the machine learning model is trained to classify edges as teeth edges or not teeth edges. In one embodiment, the machine learning model is trained to classify edges as incisal teeth edges, gingival teeth edges, interproximal teeth edges, or other edges. The machine learning model may also be trained to classify other types of edges associated with teeth and/or a mouth.

In one embodiment, multiple copies of the machine learning model may be used in parallel, and different subsets of the image patches may be input into the different copies of the machine learning model. This may speed up the edge classification of the image.

At block 1225, processing logic determines an edge classification for edge pixels from the image and the edge data (e.g., from the image patches generated using the image and edge data). At block 1230, processing logic generates a matrix that identifies, for each edge pixel, the edge classification for that edge pixel. In one embodiment, each entry in the matrix includes a separate edge classification probability for each of the types of edges that the machine learning model can identify. In one embodiment, the matrix also includes entries for pixels that are not edge pixels, and such entries have a 0% probability for each edge class. In one embodiment, the matrix is a mask that has a number of entries that is equal to a number of pixels in the image. For example, the matrix may have a number of rows that is equal to a vertical pixel size of the image and a number of columns that is equal to a horizontal pixel size of the image.

In one embodiment, a path finding operation or algorithm is applied to the edge data using values from the matrix as a cost basis. Any pathfinding algorithm may be used. Some examples of possible path finding algorithms to use include dynamic programming, Dijkstra's algorithm, A* search algorithm, an incremental heuristic search algorithm, and so on. The path finding operation may be applied to the edge data separately for each type of edge classification. For example, the path finding operation may be applied to the edge data using values of a tooth edge classification from the matrix as a cost basis to refine the edges having the tooth edge classification. The path finding operation may also be applied to the edge data using values of an aligner edge classification from the matrix as a cost basis to refine the edges having the aligner edge classification. Similar path finding operations may be performed for each of the other edge classifications.

A pathfinding algorithm that uses an edge class value as represented in the matrix as a cost basis may search for a path with a maximal cost. If a pathfinding algorithm is run to maximize tooth edge cost, then a path between pixels will be determined that results in a maximum aggregate of tooth edge probability values. For example, a pixel might have a tooth edge score of 0.8, a gingival edge score of 0.1, an aligner score of 0.05 and an other edge score of 0.05. In this case, this pixel would be identified as a tooth edge since the tooth edge score is the highest score and exceeds a threshold (e.g., a threshold of 0.7 or 70%). The tooth edge scores of the pixels may be input into the pathfinding algorithm to find the path that has the maximal cost for the tooth edge score. The path finding algorithm may be used to refine the labeled edges represented in the matrix. The matrix may be updated based on results of the pathfinding algorithm.

In one embodiment, the edges labeled by the machine learning model are not full contours of teeth (e.g., the edges may be limited to incisal tooth edges and/or gingival tooth edges). This may enable gaps between incisal tooth edges and aligner edges to be determined in later processing. In other embodiments, the edges labeled by the machine learning model are full contours of teeth that may include incisal tooth edges, gingival tooth edges and interproximal tooth edges. This may enable determinations to be made about gaps between teeth and/or interproximal gaps between teeth and an aligner.

If the edges that are labeled by the machine learning model are closed loop edges (e.g., ovals or approximate ovals that contour the teeth in the images, then the teeth may be individually identified by the machine learning model or by a subsequent machine learning model or other process. For example, the shape and/or size of individual teeth, their position in the image, their relative position to other teeth, their location on the top jaw or bottom jaw, etc. may be used to recognize the identified teeth at block 1245. This may include registering each of the identified teeth to a particular tooth label. For example, dentistry has a tooth labeling system (the Universal Numbering System) in which the maxillary right third molar is designated as 1 and the count continues along the upper teeth to the left side. Then the count begins at the mandibular left third molar, designated number 17, and continues along the bottom teeth to the right side. Other tooth numbering and labeling systems are also in use, such as the Palmer Notation Numbering System and the Federation Dentaire Internationale Numbering System. Any of these numbering systems may be used to register each closed loop tooth contour of an identified tooth with a specific tooth label or number at block 1245. In one embodiment, the machine learning model is trained to label edges according to specific tooth numbers. For example, the machine learning model may label tooth edges as tooth 1, tooth 2, and so on.

Once teeth are individually labeled, then further analysis may be made of the teeth in the image based on their known tooth label/number. For example, problem areas may be identified and associated with specific teeth. In an example, a distance between an aligner edge and a tooth edge may be greatest for tooth 8, and this information may be determined, recorded and reported to a dentist or orthodontist.

Figure 13:
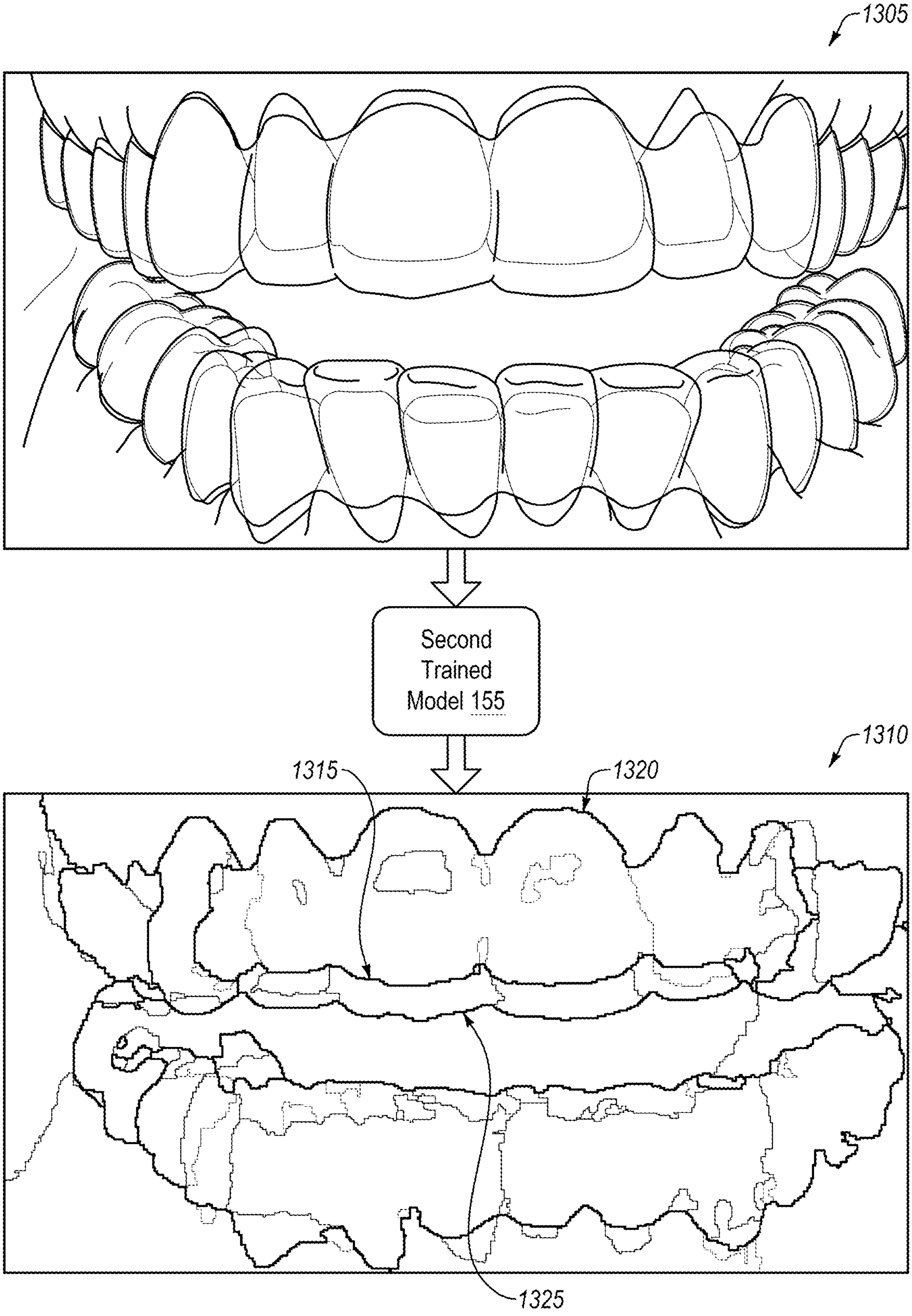
FIG. 13 illustrates labeling of edges in an image of an open mouth containing teeth, in accordance with an embodiment.

FIG. 13 illustrates labeling of edges in an image of an open mouth containing teeth, in accordance with an embodiment. As shown, an image 1305 illustrates an open mouth of upper and lower teeth of a patient, where aligners are worn over the upper teeth and lower teeth. The image 1305 is input into one embodiment of the second trained machine learning model 155, and a mask that labels edges in the image 1305 is output. As shown, the labeled edges include a gingival edge 1320, a tooth edge 1315 and an aligner edge 1325.

Figure 14:
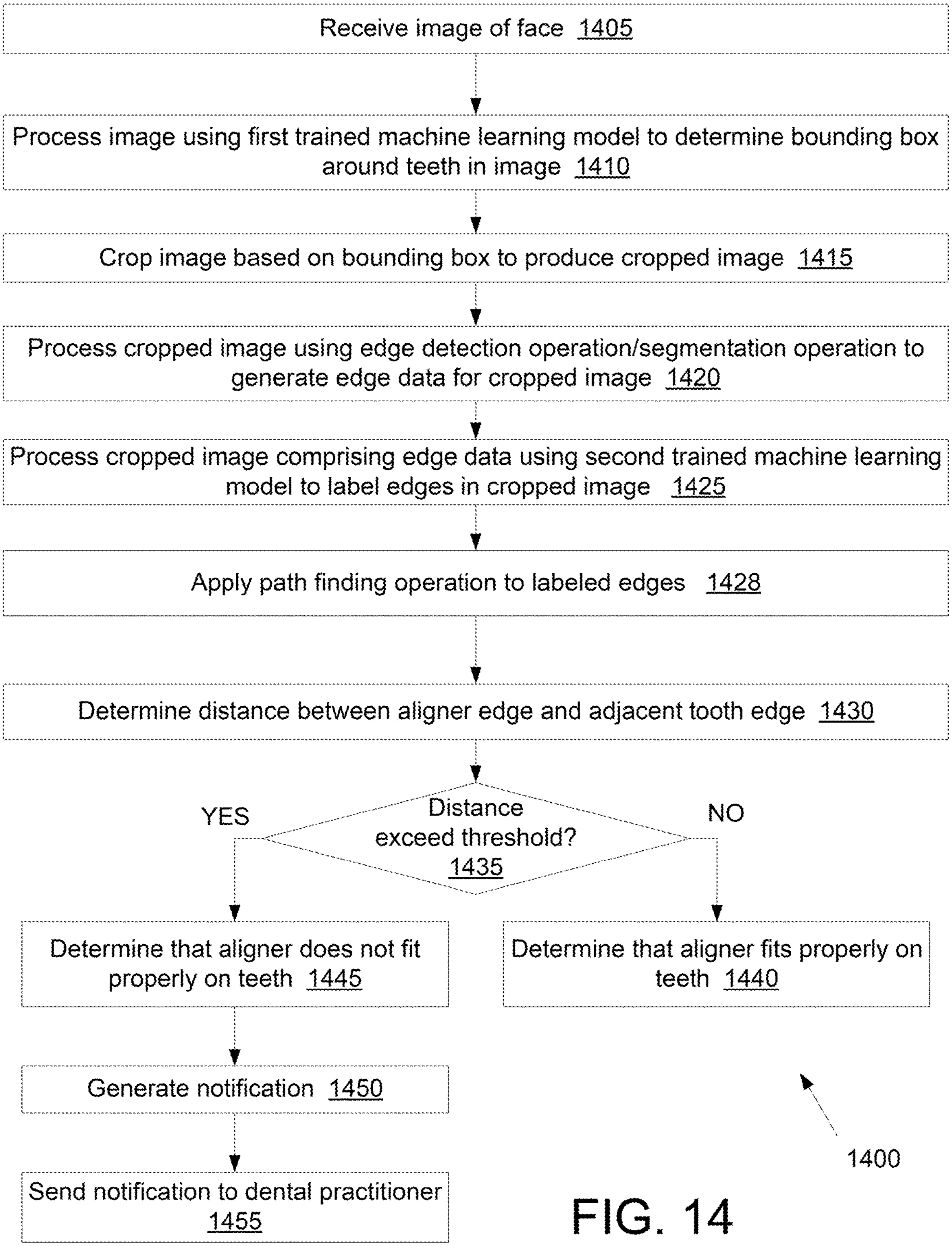
FIG. 14 illustrates a flow diagram for a method of determining whether an aligner properly fits a patient's teeth, in accordance with an embodiment.

FIG. 14 illustrates a flow diagram for a method 1400 of determining whether an aligner properly fits a patient's teeth, in accordance with an embodiment. At block 1405, an image of a face is received. The image may be a front view image or a side view image of a face. The image may have been generated by a patient during a treatment stage in orthodontic treatment. Orthodontic treatment may be divided into a series of treatment stages, where a different unique orthodontic aligner is specially designed and constructed for each stage of orthodontic treatment for a particular patient. A sequence of treatment stages are determined to reposition the teeth of the patient from the starting dentition to a final treatment goal. Each treatment stage will move the patient's teeth slightly toward the final treatment goal, and a different orthodontic aligner is worn at each treatment stage. During one or more treatment stages the patient may be asked to take a self-portrait in which they have an open smile showing them wearing the aligner associated with the current treatment stage. In one embodiment, the image of the face that is received at block 1405 is one such image. Alternatively, the image may be an image generated by a dental technician, a dental practitioner, or a third party.

At block 1410, processing logic processes the image using a first trained machine learning model to determine a bounding box around teeth in the image, as discussed herein above. At block 1415, processing logic crops the image based on the bounding box to produce a cropped image. At block 1420, processing logic processes the cropped image using an edge detection and/or segmentation operation to generate edge data for the cropped image.

At block 1425, processing logic processes the cropped image comprising the edge data using a second trained machine learning model to label edges in the cropped image, as described herein above. For example, processing logic may generate multiple image patches from the image and then input each of the image patches into the machine learning model (or an instance of the machine learning model). Multiple instances of the machine learning model may be used to process different image patches of the image in parallel in embodiments. In one embodiment, the machine learning model classifies edges in the image as one of a tooth edge, an aligner edge, a gingival edge, or a miscellaneous edge. In one embodiment, gingival edges are not identified by the machine learning model. In one embodiment, the machine learning model separately identifies interproximal tooth edges, gingival tooth edges and incisal tooth edges. In one embodiment, the machine learning model separately labels tooth edges as belonging to particular teeth (e.g., labels tooth edges as tooth 1, tooth 2, tooth 3, etc.). In one embodiment, a separate tooth registration operation is performed on the output of the machine learning model.

In one embodiment, a path finding operation or algorithm is applied to the labeled edges to refine the labeled edges. In one embodiment, the tooth registration operation is performed after the path finding operation is performed.

At block 1430, processing logic determines a distance between an aligner edge and an adjacent tooth edge. This may include determining whether a tooth edge and an aligner edge are adjacent. Adjacency may be determined based on distance and/or based on edge shape. For example, an aligner edge commonly has a shape that is similar to an incisal tooth edge. In one embodiment, for each aligner edge pixel, a distance is computed between that pixel and each of the tooth edge pixels. That aligner edge pixel may be determined to be adjacent to a tooth edge pixel that has a minimum distance to the aligner edge pixel. This operation may be performed for each aligner edge pixel to determine an adjacent tooth edge pixel. The distance may then be identified between each aligner edge pixel and its adjacent tooth edge pixel. Each such distance may be compared to a distance threshold at block 1435. If the distance meets or exceeds the distance threshold, the method continues to block 1445. If the distance is less than the distance threshold, then the method proceeds to block 1440. In addition to or instead of a distance threshold being used to determine aligner fit, the ratio of a distance of aligner edge to tooth edge to a tooth width can be used to determine aligner fit. If the distance (also referred to as gap) between the aligner edge and the tooth edge is greater than a threshold percentage of the tooth width of a tooth associated with the distance, the aligner fit may be determined to be not proper.

Tooth edges may be classified as interproximal tooth edges or incisal tooth edges in some embodiments. Different distance thresholds may be used for the distance between an interproximal tooth edge and its adjacent aligner edge and for the distance between an incisal tooth edge and its adjacent aligner edge. Additionally, in some instances tooth edges are registered with specific teeth. Different distance thresholds may be used for different teeth in some embodiments. Generally, there should be little to no gap between the aligner and the patient's teeth near the end of a treatment stage. The lack of a gap indicates that the patient's teeth have been moved to their designated positions for that particular treatment stage. A gap indicates that one or more teeth of the patient have not moved as planned.

At block 1440, processing logic determines that the aligner fits properly on the patient's teeth.

At block 1445, processing logic determines that the aligner does not properly fit on the patient's teeth. At block 1450, processing logic may generate a notification indicating that the aligner does not fit the patient's teeth. The notification may indicate the maximum distance that was detected in one embodiment. Depending on the output of the machine learning model, the notification may identify one or more specific teeth at which gaps were detected between the aligner and the teeth, may specify whether the gap is between an incisal tooth edge and an aligner or between an interproximal tooth edge and the aligner, and so on. At block 1455, processing logic sends the notification to a dental practitioner.

Accordingly, method 1400 may be performed to automatically determine, without user input, whether an orthodontic aligner properly fits a patient based on an image of the patient's face and/or mouth. Such images may be taken manually by the patient, and may be emailed, faxed, texted, uploaded or otherwise sent to a service that contains one or more machine learning models for making such a determination.

Figure 15A:
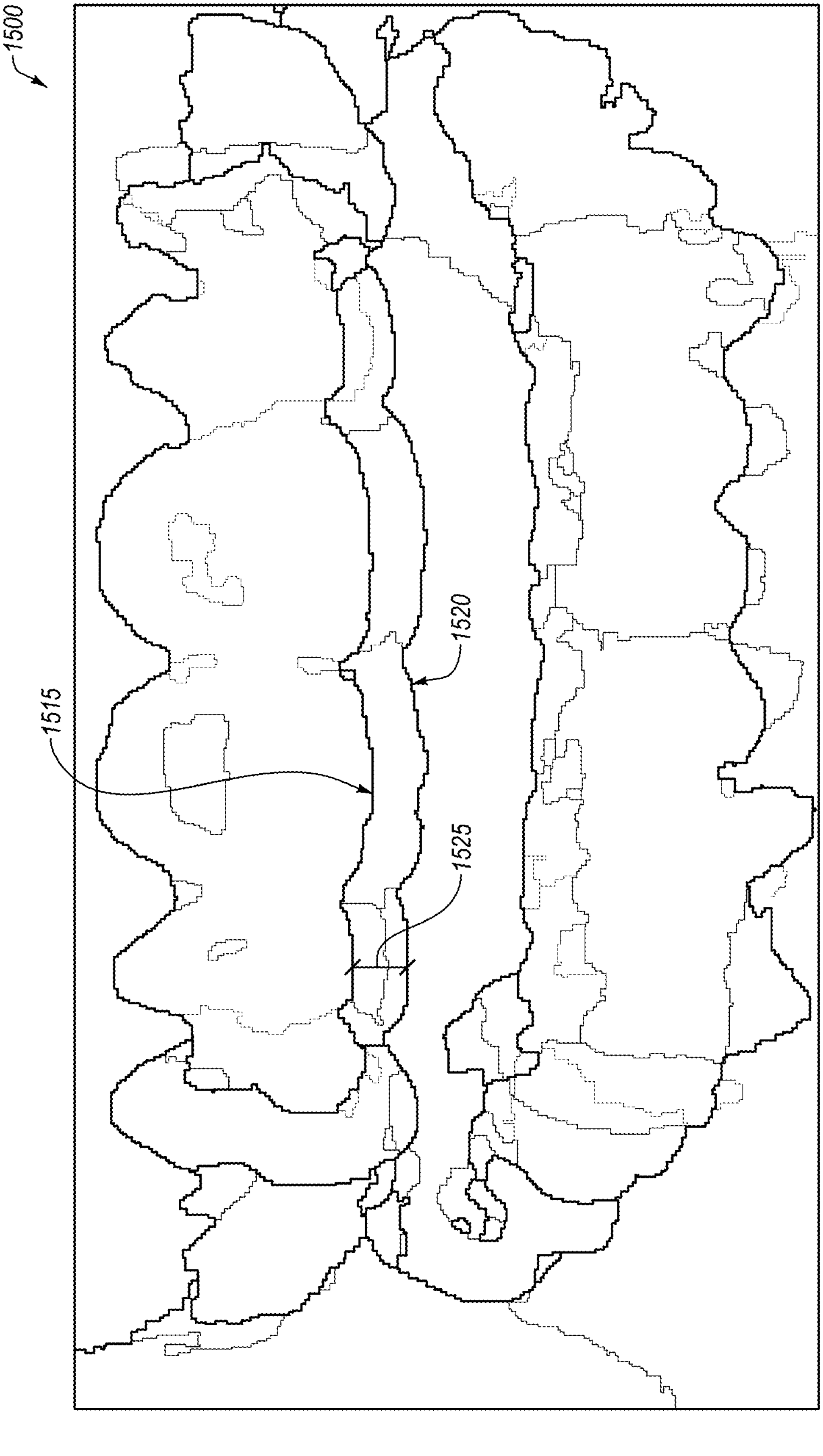
FIGS. 15A-B illustrate a gap between an aligner edge and a tooth edge, in accordance with embodiments.

FIG. 15A illustrates a gap 1525 between an aligner edge 1520 and a tooth edge 1515 in an image 1500, in accordance with an embodiment. This gap is the gap between the aligner edge 1520 and the teeth edge 1515 at a particular pixel location of the teeth edge. A similar gap may be measured for each teeth edge/aligner edge pixel. A maximum detected gap may then be determined in an embodiment.

Figure 15B:
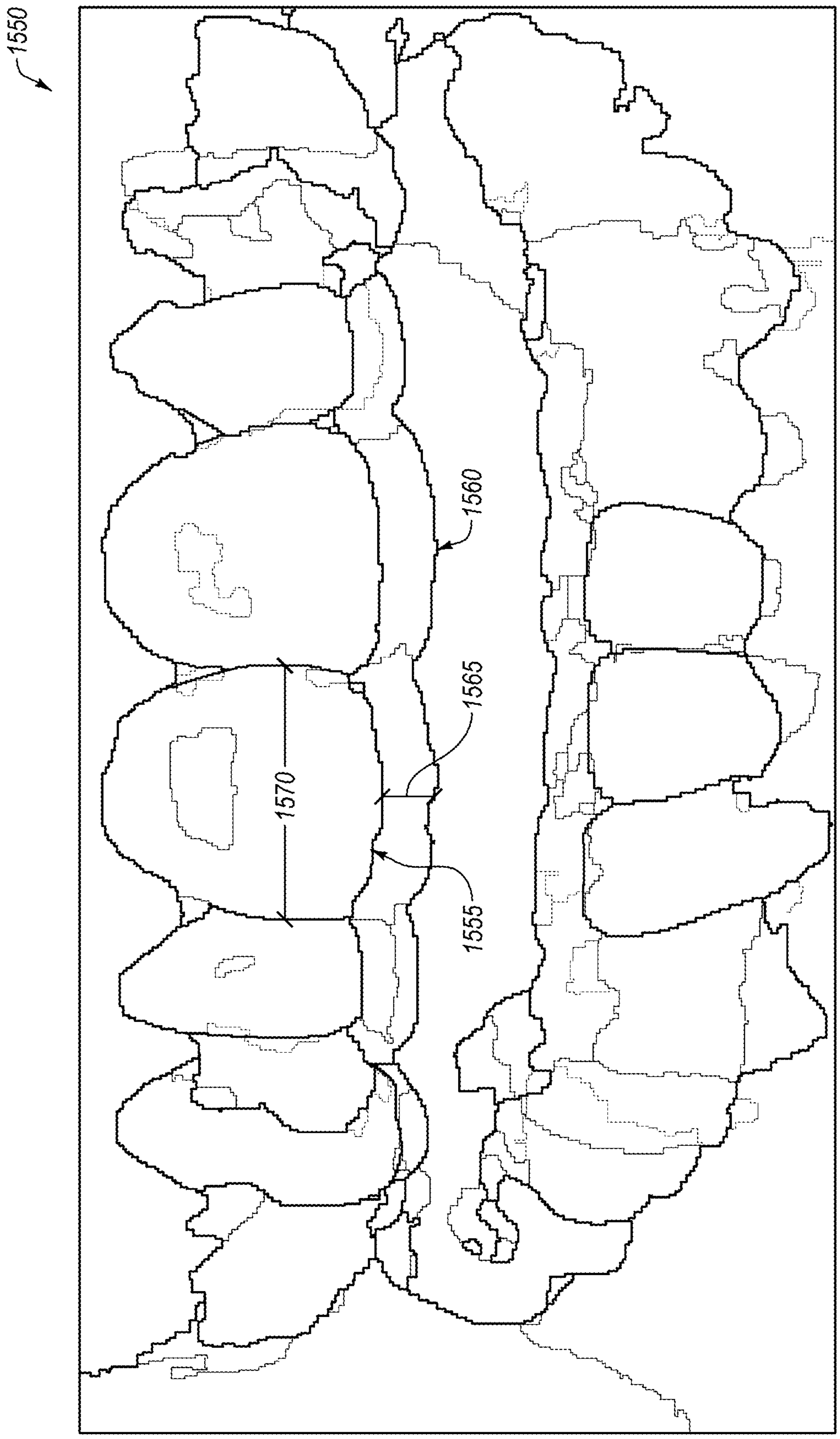

FIG. 15B illustrates a gap 1565 between an aligner edge 1560 and a tooth edge 1555 in an image 1500 as well as a tooth width 1570, in accordance with an embodiment. This gap is the gap between the aligner edge 1565 and the teeth edge 1555 at a particular pixel location of the teeth edge. A ratio of the gap 1565 to the tooth width 1570 may be computed and compared to a ratio or percentage threshold in some embodiments.

Figure 16:
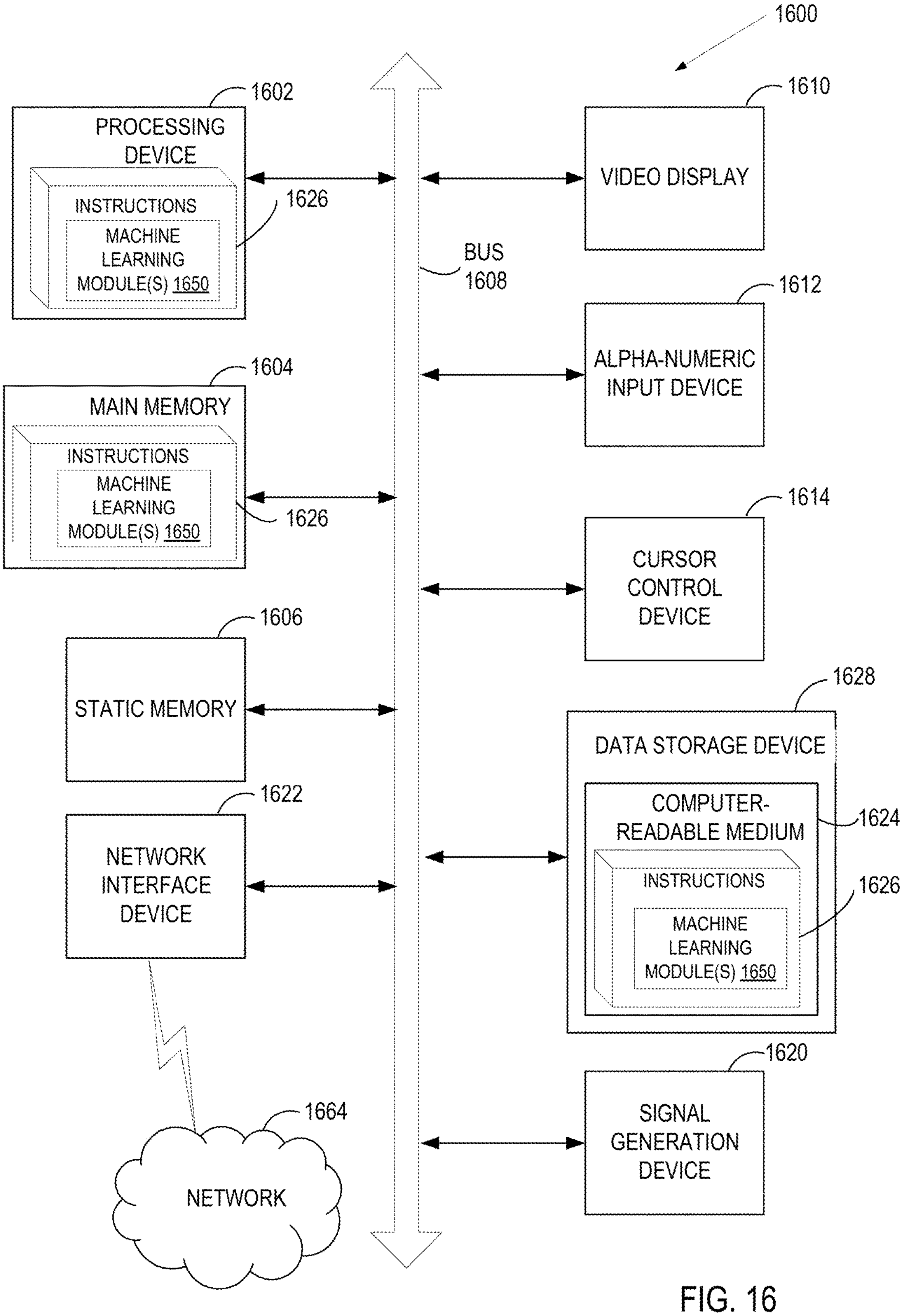
FIG. 16 illustrates a block diagram of an example computing device, in accordance with embodiments of the present invention.

FIG. 16 illustrates a diagrammatic representation of a machine in the example form of a computing device 1600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1600 includes a processing device 1602, a main memory 1604 (e.g., read-only memory (ROM), flash memory, dynamic random access memory (DRAM) such as synchronous DRAM (SDRAM), etc.), a static memory 1606 (e.g., flash memory, static random access memory (SRAM), etc.), and a secondary memory (e.g., a data storage device 1628), which communicate with each other via a bus 1608.

Processing device 1602 represents one or more general-purpose processors such as a microprocessor, central processing unit, or the like. More particularly, the processing device 1602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1602 may also be one or more special-purpose processing devices such as an application specific integrated circuit (ASIC), a field programmable gate array (FPGA), a digital signal processor (DSP), network processor, or the like. Processing device 1602 is configured to execute the processing logic (instructions 1626) for performing operations and steps discussed herein.

The computing device 1600 may further include a network interface device 1622 for communicating with a network 1664. The computing device 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), and a signal generation device 1620 (e.g., a speaker).

The data storage device 1628 may include a machine-readable storage medium (or more specifically a non-transitory computer-readable storage medium) 1624 on which is stored one or more sets of instructions 1626 embodying any one or more of the methodologies or functions described herein, such as instructions for one or more machine learning modules 1650. A non-transitory storage medium refers to a storage medium other than a carrier wave. The instructions 1626 may also reside, completely or at least partially, within the main memory 1604 and/or within the processing device 1602 during execution thereof by the computer device 1600, the main memory 1604 and the processing device 1602 also constituting computer-readable storage media.

The computer-readable storage medium 1624 may also be used to store one or more machine learning modules 1650, which may perform the operations described herein above. The computer readable storage medium 1624 may also store a software library containing methods for the one or more machine learning modules 1650. While the computer-readable storage medium 1624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:

receiving a two-dimensional (2D) image of a face of an individual;

processing the 2D image using one or more trained machine learning models to classify the 2D image as depicting one of a plurality of predefined views, and to determine one or more bounding shapes around teeth in the 2D image, the plurality of predefined views comprising:

(i) an anterior view depicting the teeth of the individual from a frontal perspective, (ii) a side view depicting the teeth of the individual from a right side perspective or a left side perspective, and (iii) an occlusal view depicting a mandibular arch or a maxillary arch;

cropping the 2D image based on the one or more bounding shapes to produce a cropped 2D image;

processing the cropped 2D image using an edge detection operation to generate edge data that identifies edge pixels in the cropped 2D image; and processing the cropped 2D image and the edge data using a second trained machine learning model to label edges in the cropped 2D image by assigning edge classification probabilities for each edge pixel.

2. The method of claim 1, wherein the 2D image is an image of a patient wearing a dental appliance over teeth, and wherein the labeled edges comprise one or more first labeled edges having a tooth edge classification and one or more second labeled edges having a dental appliance edge classification.

3. The method of claim 2, further comprising:

determining a fit of the dental appliance on the teeth based on a comparison of the one or more first labeled edges to the one or more second labeled edges.

4. The method of claim 2, further comprising:

determining a distance between a portion of a dental appliance edge and a portion of an adjacent tooth edge;

determining whether the distance exceeds a threshold; and responsive to determining that the distance exceeds the threshold, determining that the dental appliance does not properly fit the teeth.

5. The method of claim 4, further comprising:

identifying one or more teeth in the 2D image;

registering each tooth of the one or more teeth with a respective tooth label; and for each tooth of the one or more teeth, using the respective tooth label associated with the tooth to identify a specific tooth associated with the determined distance between the portion of the dental appliance edge and the portion of the adjacent tooth edge.

6. The method of claim 4, further comprising:

generating a notification indicating that the dental appliance does not properly fit the teeth.

7. The method of claim 1, wherein labeled edges comprise edge classification probabilities of a plurality of edge classifications, the plurality of edge classifications comprising a tooth edge classification, the method further comprising:

determining the edge classification probabilities for each edge pixel of a plurality of the edge pixels in the edge data; and applying a path finding operation to the labeled edges using the tooth edge classification as a cost basis to update the edge classification probabilities for one or more of the edge pixels.

8. The method of claim 1, wherein labeling the edges in the cropped 2D image comprises assigning a separate label to each of a plurality of teeth in the cropped 2D image.

9. A non-transitory computer readable storage medium comprising instructions that, when executed by a processing device, cause the processing device to perform operations comprising:

receiving a two-dimensional (2D) image of a face of an individual;

processing the 2D image using one or more trained machine learning models to classify the 2D image as depicting one of a plurality of predefined views, and to determine one or more bounding shapes around teeth in the 2D image, the plurality of predefined views comprising:

(i) an anterior view depicting the teeth of the individual from a frontal perspective, (ii) a side view depicting the teeth of the individual from a right side perspective or a left side perspective, and P2 (iii) an occlusal view depicting a mandibular arch or a maxillary arch;

cropping the 2D image based on the one or more bounding shapes to produce a cropped 2D image;

processing the cropped 2D image using an edge detection operation to generate edge data that identifies edge pixels in the cropped 2D image; and processing the cropped 2D image and the edge data using a second trained machine learning model to label edges in the cropped 2D image by assigning edge classification probabilities for each edge pixel.

10. The non-transitory computer readable storage medium of claim 9, wherein the 2D image is an image of a patient wearing a dental appliance over teeth, and wherein the labeled edges comprise one or more first labeled edges having a tooth edge classification and one or more second labeled edges having a dental appliance edge classification.

11. The non-transitory computer readable storage medium of claim 10, the operations further comprising:

determining a fit of the dental appliance on the teeth based on a comparison of the one or more first labeled edges to the one or more second labeled edges.

12. The non-transitory computer readable storage medium of claim 10, the operations further comprising:

determining a distance between a portion of a dental appliance edge and a portion of an adjacent tooth edge;

determining whether the distance exceeds a threshold; and responsive to determining that the distance exceeds the threshold, determining that the dental appliance does not properly fit the teeth.

13. The non-transitory computer readable storage medium of claim 9, wherein labeled edges comprise edge classification probabilities of a plurality of edge classifications, the plurality of edge classifications comprising a tooth edge classification, the operations further comprising:

determining the edge classification probabilities for each edge pixel of the edge pixels in the edge data; and applying a path finding operation to the labeled edges using the tooth edge classification as a cost basis to update the edge classification probabilities for one or more of the edge pixels.

14. A system comprising:

a memory; and a processing device operatively coupled to the memory, the processing device configured to:

receive a two-dimensional (2D) image of a face of an individual;

process the 2D image using one or more trained machine learning models to classify the 2D image as depicting one of a plurality of predefined views, and to determine one or more bounding shapes around teeth in the 2D image, the plurality of predefined views comprising:

(i) an anterior view depicting the teeth of the individual from a frontal perspective, (ii) a side view depicting the teeth of the individual from a right side perspective or a left side perspective, and (iii) an occlusal view depicting a mandibular arch or a maxillary arch;

crop the 2D image based on the one or more bounding shapes to produce a cropped 2D image;

process the cropped 2D image using an edge detection operation to generate edge data that identifies edge pixels in the cropped 2D image; and process the cropped 2D image and the edge data using a second trained machine learning model to label edges in the cropped 2D image by assigning edge classification probabilities for each edge pixel.

15. The system of claim 14, wherein the 2D image is an image of a patient wearing a dental appliance over teeth, and wherein the labeled edges comprise one or more first labeled edges having a tooth edge classification and one or more second labeled edges having a dental appliance edge classification.

16. The system of claim 15, wherein the processing device is further configured to:

determine a fit of the dental appliance on the teeth based on a comparison of the one or more first labeled edges to the one or more second labeled edges.

17. The system of claim 15, wherein the processing device is further configured to:

determine a distance between a portion of a dental appliance edge and a portion of an adjacent tooth edge;

determine whether the distance exceeds a threshold; and responsive to determining that the distance exceeds the threshold, determine that the dental appliance does not properly fit the teeth.

18. The system of claim 16, further comprising:

a display device of a user configured to output information based on the determined fit of the dental appliance on the teeth.

19. The system of claim 15, wherein the dental appliance is an orthodontic aligner.

20. The system of claim 16, further comprising:

a data storage device configured to store information on the determined fit of the dental appliance.

21. The method of claim 1, further comprising:

determining how many bounding shapes to use based at least in part on whether the 2D image is classified as depicting the anterior view, the side view, or the occlusal view.

22. The method of claim 21, wherein the one or more bounding shapes comprise a plurality of bounding shapes, the method further comprising:

prior to the cropping, combining two or more bounding shapes of the plurality of bounding shapes.

* * * * *